(12) United States Patent
Braunstein

(10) Patent No.: US 9,277,630 B2
(45) Date of Patent: Mar. 1, 2016

(54) APPARATUS INTELLIGENT PARALLEL VIEW LED LIGHT, METHODS OF CONFIGURATION AND CONTROLS

(71) Applicant: Zachary Leonid Braunstein, San Marcos, CA (US)

(72) Inventor: Zachary Leonid Braunstein, San Marcos, CA (US)

(*) Notice: Subject to any disclaimer, the term of this patent is extended or adjusted under 35 U.S.C. 154(b) by 0 days.

(21) Appl. No.: 14/533,512

(22) Filed: Nov. 5, 2014

(65) Prior Publication Data

US 2015/0130351 A1    May 14, 2015

Related U.S. Application Data

(63) Continuation of application No. 61/902,124, filed on Nov. 8, 2013, and a continuation of application No. 61/926,939, filed on Jan. 13, 2014.

(51) Int. Cl.
| | |
|---|---|
| *H05B 37/02* | (2006.01) |
| *H05B 39/04* | (2006.01) |
| *H05B 41/36* | (2006.01) |
| *G09G 3/32* | (2006.01) |
| *H05B 33/08* | (2006.01) |

(52) U.S. Cl.
CPC .............. *H05B 37/0227* (2013.01); *G09G 3/32* (2013.01); *H05B 33/0872* (2013.01); *H05B 37/0254* (2013.01); *H05B 37/0272* (2013.01)

(58) Field of Classification Search
None
See application file for complete search history.

(56) References Cited

U.S. PATENT DOCUMENTS

2013/0063045 A1* 3/2013 Ishikita et al. ............... 315/296

* cited by examiner

*Primary Examiner* — Jany Richardson

(57) ABSTRACT

Configurable LED light improving community safety and the environment by providing illumination as function of internal self-diagnostics and status of ambient environment, comprising: controller, sensors, LED's, interfaces, enclosure. Sensors include: ambient light, proximity, temperature, voltage, current. Interfaces include: wireless, INTERNET. LED's configurations include: single color, multicolor, flexible PCB. Enclosure configurations include: water-proof, recess, surface mounting, hidden magnets for latch-in mounting. Controller configurations define real-time control algorithm based on: sensor status; time based controls; apparatus operating acceptance criteria. Apparatus acceptance criteria include: operation within specifications; optimization of energy consumption; contribution to environmental safety. Control algorithm includes: real-time internal and external diagnostics; and controls sustaining operation within acceptance criteria. Apparatus configurations stored in non-volatile memory. LED's produce illumination parallel to the viewing surface. Apparatus in compliance with local and national regulations, and compatible with patent pending plug and power distribution. Installations include: ceilings, walls, floors; furniture; appliances; lamps; aquariums; billboards; backlighting art.

20 Claims, 16 Drawing Sheets

Figure 1:
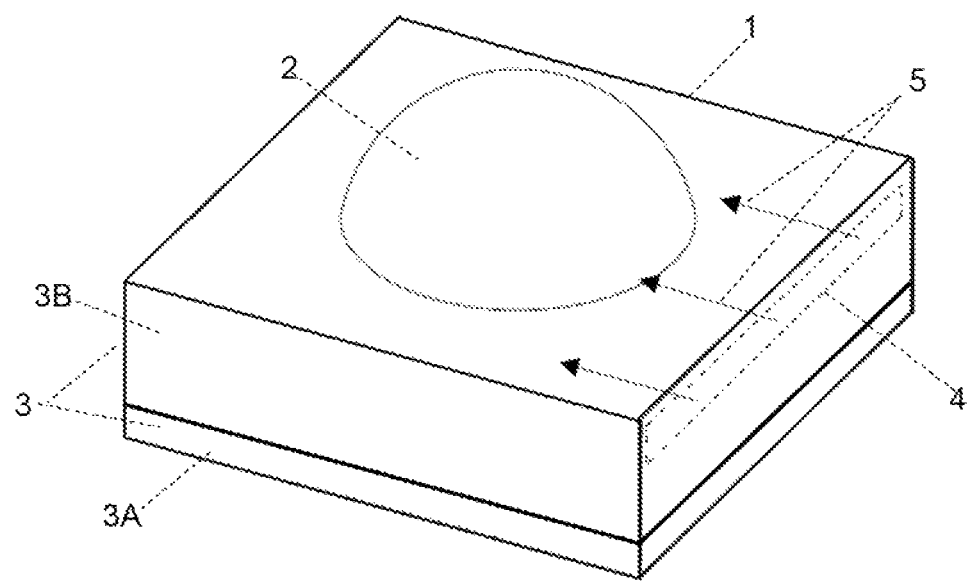

APPARATUS INTELLIGENT PARALLEL VIEW LED LIGHT, METHODS OF CONFIGURATION AND CONTROLS

CROSS-REFERENCE TO RELATED APPLICATIONS

I claim the benefits of Provisional Application No. 61/902,124 filed on Nov. 8, 2013, title "Apparatus Intelligent Parallel View LED Light, Methods of Configuration and Controls", and Provisional Application No. 61/926,939 filed on Jan. 13, 2014, title "Apparatus Intelligent Parallel View Illumination Pix-Cell, Methods of Configuration and Controls"

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable

BACKGROUND OF THE INVENTION

LED as illuminated devices for general lighting gain popularity in a variety of application, including residential light bulbs, replacing the inefficient and less reliable incandescent light bulbs. Majority of devices used for general lighting, unless covered or located at a different angle, are generating direct illumination, by sending the generated light directly toward the surface aimed for illumination. While this is, perhaps, the most energy efficient method of using the light, it does create problems. In majority of application, when an user looks toward an existing light fixture, the source of light is so bright and "focused" or concentrated, that the entire experience of looking at a light fixture could be very unpleasant and may present a health hazard. In addition, since the light sources radiate energy in the direction of the light, long exposure to this sort of radiation, may also cause concerns in respect to health. This is in particular true, when a large billboard or display with huge number of LED's is viewed from a short distance. The highly concentrated source of light with moderate diffusing will still cause a "blinding" effect after being looked even for a short period of time. Increasing the "density" of diffusing the "bright spots" to eliminate the "blinding effect", will significantly reduce the efficiency of generating illumination per unit of electricity. Not all users are educated or even old enough to understand the importance of avoiding looking directly at the existing bright sources of light for an extended period of time. It is definitely not healthy or even pleasant looking at a light bulb shining the light directly into your face. In terms of energy conservation, most of lights lack intelligence, i.e. embedded controls, which limits their configuration options. In addition, most have no self-diagnostics, which would allow the light to monitor the environment, and adjust its performance to: sustain reliability and longevity of the product, maintaining efficiency of utilizing energy resources powering the light, etc. In addition, illuminated devices, including the ones providing general illumination of our homes, commercial buildings, etc., at some point will need to comply with local and state ordinances. As technology is moving forward, the ordinances are revised to take advantages of emerging technologies. It would be beneficial to have intelligent illuminated lights, which can be initially configured to meet current regulations, including ordinances, and then re-configured to incorporate modifications to the ordinances.

BRIEF SUMMARY OF THE INVENTION

The parallel view (or indirect) illumination lights described in this application produce light under such an angle that the most bright portion(s) of the source of the light (the illumination devices itself, including LED's), are not visible by a naked eye or a viewer. In addition, the direction of illumination produced by the parallel view LED lights described in this application, directed practically in-parallel to the surface being illuminated. A person looking at the parallel view light source for a considerable period of time will not experience a "blinding effect", and as result, the indirect or parallel view illumination is safe for all. These types of LED lights can be designed and configured for installations into ceilings, walls, floors, furniture, light fixtures, lamps, appliances, and other applications. The lights can be configured for installations as recess illumination. The parallel view illumination principals could be less effective in generating lumens per unit of electricity, aimed toward an area, but are by far more pleasant and esthetically beautiful to look at. While direct illumination, in practical terms, cuts the house in "half" (you can't raise your head to see the ceiling when existing lights are on) the parallel view illumination, in contrast, opens the entire house for pleasant illumination and enjoyment. It opens an opportunity to decorate the ceilings which are pleasant to look at during the day with lights off and during the evening and night hours when parallel view lights are fully on. Described apparatus intelligent parallel view LED light can include: controller, sensors, wireless interfaces.

Sensors can include: ambient light, proximity, temperature, voltage, current Operator and remote controller Interfaces include: wireless LAN and INTERNET. Interfaces include communications within the apparatus and communication from a remote device or controller to the apparatus, and include: interfaces between operator and apparatus; interfaces between host controller and apparatus; interfaces between devices within the apparatus. LED's configurations include: single color, multicolor, with mounting available on flexible PCB's to fit desired shape of the enclosure. Enclosure configurations include: water-proof ratings: mounting options for recess and surface installations; optional hidden magnets or metal inserts will allow snap-in installation to respectively a surface with metal or magnetic elements. Sensor status configurations include: setting sensor trigger points, such as levels of ambient light for ambient light sensor; distances of detectable object for proximity sensor; temperature levels such as low, normal, high, unsafe levels for temperature sensor. Controls configuration includes defining real-time control algorithm based on sensor status; time based controls; operating limits; acceptance criteria. Operating limits include: illumination intensity, which can be set as function of ambient light; energy consumption, which can be set per local ordinance limits; internal temperature to ensure safety and longevity of the product. Control algorithm includes real-time diagnostics and controls to achieve criteria set by configuration. Apparatus configuration stored in non-volatile memory. Enclosure configurations include: light retaining and reflection, to maximize efficiency of converting electrical energy to light. The discrete LED's are mounted along the side walls of the enclosure, and are not visible by observer. The LED's produce illumination parallel to the viewing surface. Apparatus can be powered by DC or low power AC, and is compatible with plug and power distribution, as described in this application, and described in my patents. Apparatus configurable in compliance with local and national regulations. Apparatus configurations include configurations designed for installations as general lighting in: residential ceilings, walls, and floors. Apparatus configurations also include: illumination of sections of furniture; illumination of sections of appliances. Additional configurations of the apparatus include replacing lamps in stand-alone floor models, desk and wall mount lamp fixtures. Apparatus is configurable for appropriate water-proof ratings, and can be installed inside aquariums. Apparatus can be used as a parallel view round or square mini-pixel for creating illuminated billboards, as well as backlighting art. Apparatus can be configured a stand-alone apparatus, or as an apparatus consisting of several apparatus comprising a system of apparatuses. The principals, technology and methods of controls described in this application, are compatible with respective principals, technology and methods of controls described in my other patents and patent pending applications, including the ones listed below:

U.S. Pat. No. 8,341,837 "Modular Power Distribution and Control System";

U.S. Pat. No. 8,099,261 "Low-cost Solid-state Identification Device";

Patent pending U.S. Ser. No. 13/731,103 "Plug and Power Distribution and Control Apparatus";

Patent pending U.S. Ser. No. 14/455,928 "Apparatus Intelligent LED Illuminated Sign, Methods of Configuration and Controls".

Patent pending U.S. Ser. No. 14/475,911 "Apparatus Real Time Control and Navigation System Using Networked Illuminated Signs Improving Safety and Reducing Response Time of First Responders".

For simplicity, the word "patents" is used in this application for referencing the above patent and patent pending applications.

For simplicity, the apparatus described in this application, is also referenced as LED parallel view light, or LED light.

Parallel view LED lights can be configured for LED's producing single color illumination, or configured with RGB LED's producing multi-color illumination, or combination of both.

Example: A system consisting of five color LED parallel view lights can be used as recess lighting for an average size room. The 12 VDC power to the system can be provided by a single 12 VDC 2A power supply. Each individual color LED parallel view light within the system can be controlled independently of other color LED parallel view lights, using operator remote infra-red controller. The operator controls can include: selection of color; setting illumination intensity; turning ON/OFF; setting time to stay ON: color rolling, blinking, and other light effects supported by LED devices and controller.

The plug and power interfaces allow to add a power backup battery to power the system, such as solar battery. All or selected lights within the system can have battery backup power. When the electricity is off during the power outage, the connected lights within the system will stay ON being powered by the battery. The apparatus consist of: illuminated panel; illumination components; sensors; controllers; interfaces; enclosure. Illuminated panel includes: acrylic partially translucent panel, with the backside of the panel being backlit by the illumination components. Illumination components include: solid state illumination devices, such as LED's. Single color, or multi-color devices can be used. Illumination components direct majority of their light parallel to the backside of the illumination panel. Sensors include: ambient light; internal temperature; power parameters voltage, current; proximity. Interfaces include: wireless, such as infra-red remote; wireless network, such as INTERNET: wireless interface to mobile devices, such as cell phones; operator interface, such as: infra-red remote. The apparatus can be configured for general lighting, such as recess lighting installed into a number of surfaces, including: ceilings; walls; floors within a building structure Indoors, or for mounting outdoors with appropriate environmental ratings. The controller of the apparatus is connected to sensors and interface components. The controller of the apparatus can be configured to store in its non-volatile memory trigger points for sensors, which can be set for each sensor. Trigger points for ambient light sensor include different levels of ambient light. Trigger points for proximity sensor include different distances of a detectable object from Trigger points for temperature sensor include different levels of temperatures within the apparatus. Trigger points for power voltage sensor include different levels of: voltage of the power supply powering the apparatus; voltage applied to components of the apparatus. Trigger points for current sensor include different levels of: current of the power supply powering the apparatus; current applied to components of the apparatus. Configuration of the apparatus includes control algorithm associated with each trigger point of a sensor. Control algorithm based on ambient light sensor includes: adjusting power to illumination devices per set trigger points of the ambient light sensor, including turning the power OFF when there is sufficient level of ambient light. Control algorithm based on proximity sensor includes: adjusting power to Illumination devices per set trigger points of the proximity sensor, including increasing the illumination intensity when an object is detected, and then going back to original setting when the object is no longer detected. Control algorithm based on temperature sensor includes: adjusting power to illumination devices per set trigger points of the internal temperature sensor, including turning the power OFF when the temperature reached a trigger point considered too low or too high for sustaining operation of the apparatus for longevity as listed in the apparatus specifications.

Apparatus by monitoring sensors and executing control algorithms based on their status can be classified as apparatus performing self-diagnostics with the main objective to avoid premature failure, and maintain apparatus in good working condition during projected time of longevity. Results of self-diagnostics can be communicated by the apparatus to operator via specific status of the illumination components, such as: color, blinking. Results of self-diagnostics can be communicated by the apparatus to remote controller over wireless interface. Configuration and controls of the apparatus can be executed by remote controller over wireless interface, and the apparatus can acknowledge the command received from the host by echoing the same command back to the remote controller. The value of trigger points and associated control algorithm are stored in controller non-volatile memory. The value of trigger points and associated control algorithm can be stored in a remote controller, as part of "cloud" technology, and other innovations available through wireless interfaces. The apparatus can be configured as: a stand-alone independent device: a master device or as a slave device. The stand-alone configuration enables the apparatus operation independent of other devices or systems. The master configuration enables the apparatus to interface with other devices or apparatuses within a system of apparatuses. The slave configuration enables the apparatus to be interfaced and controlled by a master apparatus within a system of apparatuses. The interface between master and slave apparatuses configuration includes: wireless, wired, and combination of both. The apparatus with wireless interface can be configured and re-configured remotely, by a remote controller over wireless interface network, including INTERNET. During the initial installation, the apparatus is configured per requirements of the local ordinances, which can include: maximum power consumption; limits of illumination power; requirement to use ambient light sensor to control illumination.

After installation, there can be a need to change the configuration. The need can come from changes in ordinances.

Example 1 of changes in configuration which are related to the apparatus power efficiency, lowering the maximum power consumption during ON state. Based on these changes the apparatus can be re-configured by the: operator locally, or by a remote controller over wireless interface, to meet the new requirements. The re-configuration is this case will include lowering the trigger point for maximum power consumption, which can be achieved by lowering the maximum illumination power.

Example 2 of changes in configuration which are related to the apparatus Illumination Intensity, adjusting illumination higher, as the illumination devices are recognized as being more efficient during ON state. Based on these changes the apparatus can be re-configured by the: operator locally, or by a remote controller over wireless interface, to meet the new requirements. The re-configuration in this case will include increasing the trigger point for maximum illumination power, which can be achieved by increasing the maximum illumination power.

Example 3 of changes in configuration which are related to the apparatus controls, requesting the apparatus illumination to be controlled by a photo-switch, turning the apparatus ON when there is insufficient ambient light, and then OFF when there is. Based on these changes the apparatus can be re-configured by the: operator locally, or by a remote controller over wireless interface, to meet the new requirements. The re-configuration in this case will include use of trigger points of the ambient light sensor to control ON-state and OFF-state for illumination devices. ON-state trigger point would represent insufficient ambient light, as it happens during evening and night hours. OFF-state trigger point would represent sufficient amount of ambient light, as it happens during morning and day hours.

The apparatus can use the ambient light sensor to adjust the intensity of the illumination power per set trigger points of the ambient light sensor, providing sufficient amount of illumination so that the image or illuminated component of the apparatus, will be visible at all times.

The configurations of the apparatus, as an individual light or a system of lights, include:
1) Single color with centralized controls
2) Single color with operator remote controls and centralized controls
3) Multi-color with centralized controls
4) Multi-color with operator remote controls and centralized controls
5) Any combination of above Wireless interfaces will include INTERNET, and mobile devices. Specific applications can support configuration of an apparatus down to individual configuration parameter, or a predefined configuration setting associated with configuration of several parameters.

BRIEF DESCRIPTION

Drawing Content and Listing

My application contains drawings listed in Table 1, below.

TABLE 1

List of Drawings

Figure 3:
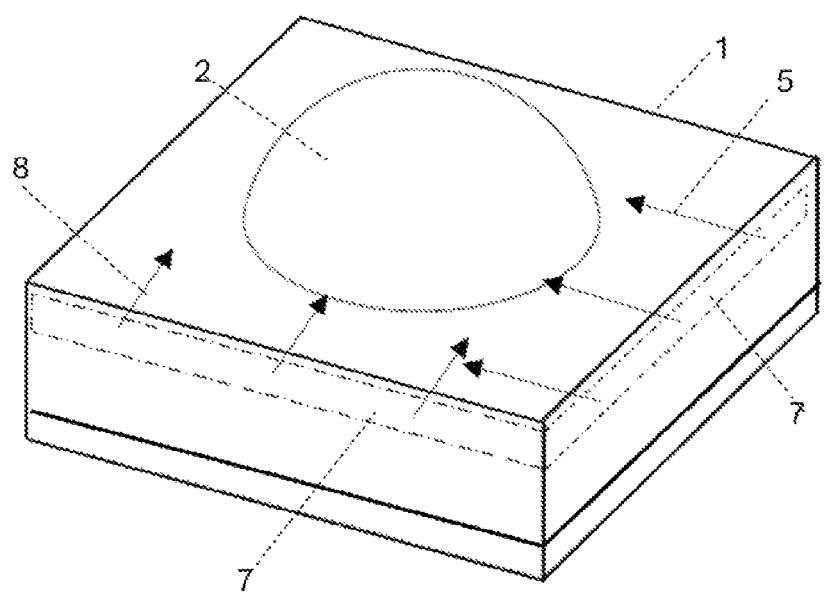

| FIGS | Description |
|---|---|
| 1 | 3D view apparatus configured with enclosure consisting of square base, and top illuminated panel configured as a dome, with one LED strip along inner perimeter of one side of the top |
| 2 | 3D view apparatus configured with enclosure consisting of square base, and top illuminated panel configured as a dome, with two LED strips along opposite sides along inner perimeter of the top |
| 3 | 3D view apparatus configured with enclosure consisting of square base, and top illuminated panel configured as a dome, with single LED strip along adjacent sides along inner perimeter of the top |
| 4 | Side view of apparatus shown on FIG. 1 |
| 5 | 3D view apparatus configured with enclosure consisting of square base, and a square top illuminated panel, with single LED strip along adjacent sides along inner perimeter of the top |
| 6 | 3D view of apparatus shown on FIG. 3 mounting to a ceiling |
| 7 | 3D view of apparatus shown on FIG. 3 mounting to a ceiling with dimensional parameters confirming LED's are not visible by observer |
| 8 | Example 1: Apparatus configured as a system wired using plug and power distribution method |
| 9 | Example 2: Apparatus configured as a system wired using plug and power distribution method |
| 10 | Example 3: Apparatus configured as a system wired using plug and power distribution method |
| 11 | Example 4: Apparatus configured as a system wired using plug and power distribution method |
| 12 | Example 5: Apparatus configured as a system wired using plug and power distribution method |
| 13 | Example 6: Apparatus configured as a system wired using plug and power distribution method |
| 14 | Example 7: Apparatus configured as a system wired using plug and power distribution method |
| 15 | Example 8: Apparatus configured as a system wired using plug and power distribution method |
| 16 | Example 9: Apparatus configured as a system wired using plug and power distribution method |
| 17 | 3D view apparatus configured with enclosure consisting of square base, and top illuminated panel configured as a square |
| 18 | 3D view of apparatus shown on FIG. 16 with LED strip installed along inner perimeter of the squared base |
| 19 | Front view of apparatus configured as a system comprising a billboard by using individual apparatus shown on FIG. 5 |
| 20 | Side view of apparatus shown on FIG. 19 |
| 21 | Front view of apparatus configured as a system comprising a billboard using individual apparatus shown on FIG. 1 and apparatus shown on FIG. 5 |
| 22 | Side view of apparatus shown on FIG. 1 without addition optional modules |
| 23 | Side view of apparatus shown on FIG. 22 with optional add-on LED control module (70) |
| 24 | Side view of apparatus shown on FIG. 23 with optional add-on wireless interface and control module (71) |
| 25 | Side view of apparatus shown on FIG. 5 without addition optional modules |
| 26 | Side view of apparatus shown on FIG. 25 with optional add-on LED control module (70) |
| 27 | Side view of apparatus shown on FIG. 26 with optional add-on wireless interface and control module (71) |
| 28 | Example of apparatus configured as a traffic light |
| 29 | Example of apparatus configured for illumination of signs, art |
| 30 | 3D view of apparatus shown on FIG. 5 with the base mounting to a top surface |

TABLE 1-continued

List of Drawings

| FIGS | Description |
|---|---|
| 31 | Block-diagram of an apparatus configured with a master light interfaced with a host controller via wireless interface, and then with other lights for direct and indirect controls |

Drawing Convention and Format

Drawings with this application, in addition to USPTO requirements, are:
a) Not to scale.
b) Dashed lines are used for outlining a group of parts, sub-assemblies and assemblies, which can be identified by unique number as a sub-assembly or as an assembly

DEFINITIONS

My application contains definitions of specific components or processes, which are listed below. Definitions are used and expanded in greater details in later paragraphs.

Ambient Light Sensor

Defined as a Sensor which detects level of ambient light, and generate signal proportional or representing levels of ambient light. The apparatus configuration includes provision for a sensing window, allowing the ambient light sensor to be exposed to ambient light. Ambient light sensor is connected to the controller of the apparatus. Controller will measure the signal generated by the ambient light sensor and based on specifications of the ambient light sensor, calculate amount of ambient light present. Controller performs controls associated with preset trigger points of the ambient light sensor. Ambient light sensor configuration includes interface between operator and controller. By blocking the sensing window of the ambient light sensor preventing the ambient light reaching the sensor, the operator can trigger the status of the ambient light sensor between two states: state 1-ambient light present at a level above preset minimum level: state 2—ambient light is not present, or is below the preset minimum level limit. By triggering these states at predefined sequences, operator can execute commands related to apparatus: configurations and controls.

Backlighting

Defined, as a method of positioning illumination devices, including solid state, behind a surface, which is required to be illuminated. Backlighting can be used for:
a) General Illumination of an entire or a selected section of a surface, which can include an in-printed Symbol or Symbols. An example: Backlighting of a rectangular section of a transparent flat surface, including clear plastic, which can have in-printed or silk-screened in black color Symbols, including—alpha-numeric characters, As result, the Symbols can stand-out in black color, while the remaining area of the selected section cold be illuminated by solid state devices, including white or light color LED's, to enhance the visibility of the black Symbols.
b) Symbol illumination, when respective illumination devices, including solid state, can be mounted behind along the outline of a Symbol or selected Symbols in-printed on a colored surface, with Symbols outline signified by in-contrast in transparent or lighter color. An example: a transparent plastic surface, with sections painted in light color, while the outline of a Symbol or Symbols not painted, i.e. remained—transparent. Backlighting in a form of white or color LED's can be mounted along the outline of the Symbols, enhancing Symbol presence in contrast to the surrounding area.
c) Or combination of General and/or Symbol illumination of selected sections of a given surface with a number of Symbols in-printed, which via illumination parameters, including: intensity, color, can further enhance, visibility of Symbols on a given surface.

Battery

Defined as a battery which can be configured as a conventional battery pack, or solar battery, or another power storage device within required power specifications.

Controller

Defined as an intelligent device, which can be installed on a PC board, including flexible PCB, which can house components, including: electronic Control devices—embedded controllers and support electronics; Light Sources, including LED's; communication electronics for wired and/or wireless communications with a remote host computer, other Modules; sensors which detect change in exterior lighting, and which are used by Controller to optimize required illumination intensity; sensors which detect ambient temperature, and which are used by Controller to optimize amount of drive power of illumination components; sensors which detect motion of an object, and are used by Controller for add-on security feature—to either acknowledge the event, or sound an alarm of an intruder; driver electronics which are used to power electronics and other devices; sensors, which are used for remote control: interface connectors. The Controller configuration parameters include: size, thickness, shape to meet requirements of a specific application. Controller power source includes power sources with respective DC power specifications (voltage, current, ripple, temperature range): AC-DC power converters: solar energy collection technology based DC power source; batteries, Controller configurations include interface to remote devices, including: remote Controller via LAN; other devices, including activation relays via direct wiring interfaces; with an objective to provide required level of control for a specific application. Controller configurations include monitoring status of Sensors, and based on embedded algorithm executing controls in real-time to attain acceptance criteria stored in the controller memory. Controller can be configured to include interface for local operator, and support operator ability to preset control functions. Controller can be configured to include self-diagnostics and report its status to remote HOST and local operator via visual and voice signals.

Communication Interface

Defined as serial communications between Light Controller and variety of devices, such as: remote computer, remote Controller, remote Module, Communication Interface can be implemented based on standard communication platforms, such as: RS232, USB, wireless technologies, such as cellular, INTERNET. Communication Interface can be configured to support multi-drop LAN, which can allow connection of several Light Controllers via LAN to remote computer, or Controller.

Control Function

Defined as a function, which can be executed by a local Controller of an Identification Device upon: direct request by an user via wireless remote control device; condition when a specific Trigger Point of a Sensor has been reached; request by a remote Controller over LAN. Control Function can include: tuning ON/OFF devices, such as: Illumination Devices, audio.

Direct Lighting

Defined as a method or a principal of installing directional Light Source(s) inside a device, including general purpose light fixtures, lamps, etc., and the directional Light Source(s) directing the light or illumination toward the area primarily perpendicular to the direction of the light produced by the directional Light Source(s). Bright spots of directional Light Source(s) are not pleasant, and may present a health hazard of looked at a prolong period of time. Example: lamp fixture installed on a ceiling with a directional source of light (LED, incandescent light bulb, etc.) directing its majority of illumination or light either perpendicular to the surface of the ceiling, or at an angle from the surface of the ceiling. As result, an observer looking at the lamp fixture from an area underneath the fixture, would observe the bright spots of the source of the Light, unless a rather dense diffuser reducing the "bright spot" is placed in-between. The majority of existing discrete lamp fixtures, with some exception of fluorescent lights, create bright spots. These bright spots are not really pleasant to look at by anybody (because of a "blinding effect"), and may even present a health hazard for small kids steering at these lights. In the evening and night hours, when the Direct Lighting is on, for example on ceilings inside a residential house, an observer cannot look up at the ceiling for too long. In contrast, in-Direct or Parallel View illumination devices will produce substantially parallel lighting in respect to an observer. In-Direct or Parallel View illumination will produce less efficient illumination per converted unit of energy, but will provide other important benefits, including: safety of looking at a light sources (including kids occasionally steering at the lights); esthetics and pleasant illumination without limitations.

Illumination Control

Defined as a Light Control, as it reflects on illumination Parameters of a specific area or a surface. AN available Light Control features, such as: intensity, color, special effects can be used by Controller to achieve desired Lighting effects for any given application.

Illumination Parameters

Defined as a variety of Light Control parameters, which can be applied toward illumination of a designated area or surface, which can be selected by Controller. Illumination Parameters can include: illumination ON/OFF control: illumination intensity; Illumination color: Illumination cycling ON/OFF at selected frequency with respective selection of ON-cycle and OFF-cycle; illumination sequence; Selection of Illumination Parameters and their control for each given application, can be based on the type of illumination devices chosen to ensure their performance within specification parameters.

Illumination Device

Defined as a solid-state device, such as LED, which can be used by Controller alone, or in combination with other Illumination Devices to illuminate Designated Area(s). Illumination Device(s) can be used to provide; illumination of Symbol(s). Perimeter Lighting, Illumination Devices can be: of different colors, in standard or custom packaging per specific application.

Instruction Set

Defined as a number of Commands, which can be executed by Controller. Commands can be sending by a host computer over Communication Interface, or entered manually by an operator via dedicated program running on a remote computer or Controller. Instruction Set can be defined as a set of grouped functional Commands, which can include the following groups: Mode, Run, Status, Mode Commands can include such instructions as: Program; Manual; Auto. Program Mode can include instructions, which can allow configuration of a Light Controller for any specific application. Status Commands can include instructions of verifying state and/or status of a Light Controller. Run Commands can be selected from a wide variety of available Commands for any specific design and application, with an objective to achieve the most effective Controls. For each specific application, or installation, Instruction Set can be selected or pre-defined, and each Command can be as simple as a single unique (Command-specific) ASCII character, which can be echoed back by Light Controller to the source (operator, computer or Controller) to acknowledge that respective Command was received and executed.

Light Control

Defined as electronic Control of Light Parameters of an individual solid-state Light Source, or a group of solid-state Light Sources. Due to superior characteristics of solid-state Light Sources, the Controller can execute an extensive range of Light effects for a specific application. The Lighting effects can be one or combination of any of the following Controls applied to individual solid-state Light Source or a designated group of Light Sources:

a) Cycling ON/OFF with stable or variable—ON-time, OFF-time, cycling frequency b) Dynamically changing drive power, which can be accomplished by changing either voltage, or current, or both, which can increase illumination intensity c) Applying Controls listed in (a) dynamically to a group of Lights in one direction, or changing directions d) Dynamically changing selected group of Lights in terms of their location and number of Lights within a group Light Controller Defined as a number of electronic components, which can include embedded Controllers, which can reside on the same PC board as the Light Sources, such as LED's, and which can execute required Control functions requested by operator or remote host computer. Light Controller, which can be based on standard embedded micro-Controller, or an ASIC, can be employed together with required peripheral support components, to execute a variety of Controls, which can take advantage of a wide-range of characteristic features of solid-state Light Sources. The embedded micro-Controller can have a built-in temperature sensor, which can be used by Controller embedded software for monitoring ambient temperature surrounding micro-Controller. Since operating temperature of micro-Controller can be significantly higher than the required or selected maximum operating temperature of Light Sources within the Identification Light assembly, the micro-Controller temperature data can be used by Light Controller to ensure safe operation and Control of respective Light Sources. For each specific application, a limit of maximum operating temperature inside Identification Light assembly can be selected. In the event, the micro-Controller temperature reached that maximum limit, Controller software can execute one or combination of the following:

a) Turn OFF all Light Sources b) Turn OFF selected Light Sources c) Lower applied drive power to Light Sources d) Execute a "warning-type" state, which can be pre-defined, and can include a specific Light effect e) Inform operator or computer via serial communication message of the fact the temperature reaching the set limit Light Controller configurations include required Communication Interfaces, with such features as:

a) Remote configuration of available Light Control features b) Remote configuration of available Light Control features, including selection of specific Light effects to represent a specific "warning" state, which can include: temperature limit: failure of one of parameters monitored by self-diagnostics of Controller software c) Periodic or on-request reporting of Light Controller state and/or Status, which can include: current temperature data; state of selected group of Light Sources, Light Diffuser Defined as an optical component which when placed in-front of discrete Illumination Devices can blend their combined illumination, and can reduce or eliminate appearance of bright spots on the surface being illuminated by these Illumination Devices. A diffuser can be configured to improve uniformity of light.

Light Parameters

Defined as a variety of Control parameters applied toward solid-state Light Sources, and which can be selected by Controller. Light Parameters can include: Light ON, Light OFF, Light intensity, Light color, Light cycling ON/OFF at selected frequency with respective selection of ON-cycle and OFF-cycle.

Light Retainer

Defined as an optical component which can be placed in-front of Illumination Devices, and which can serve to direct and/or retain as much illumination toward a designated area, as possible.

Parallel View Illumination

Defined as a method or a principal of installing directional Light Source(s) inside a device, including LED's, and the directional Light Source(s) directing their light or illumination parallel to the area being illuminated. Parallel View lighting eliminates the "bright spots". As needed, a relatively simple diffuser can be added to even the illumination intensity produced by the Parallel View light fixture. Example: lamp fixture installed on a ceiling with a directional source of light—LED strip, which is installed along the inner perimeter of the fixture, and directing majority of illumination or light inside the fixture substantially parallel to the surface of the ceiling, or at a small angle from the surface of the ceiling. As result, an observer looking at the lamp fixture from an area underneath the fixture, will not observe the bright spots of the source of the Light. In-Direct or Parallel View illumination will produce less efficient illumination per converted unit of energy, but will create other important benefits, including: safety of looking at a light sources; esthetics and pleasant illumination without limitations. In addition, a diffuser can be added to improve uniformity of the illumination produced by a Parallel View light fixture.

Sensor

Defined as a device or component, which can detect changes in voltages, currents flowing through electrical circuits, or detect changes in environmental or ambient conditions, such as: presence of ambient light, temperature, humidity, moving or approaching object. The sensor can be located inside of a main module or secondary module. These can include motion, light, sound, light through a camera (visible/infrared). As an example, a sensor in the module can detect motion, and as instructed, can activate either directly via dedicated electronic components, or via controller, a Control Function, which can include: illumination of the modules. In addition, it can activate other built-in devices of the main module, which can include: video camera for security purposes, pre-recorded sounds over a microphone. Each Sensor can have sensor-specific Trigger Points or set levels, which can be set or programmed by an user, and which can be stored in a non-volatile memory of Controller. Controller in real-time can monitor Sensors, and detect condition when a respective Trigger Point has been reached. Controller can execute a Control Function, as programmed or set by an user, when a specific Trigger Point or combination of Trigger Points has been detected. Sensor can be also defined as a component or device within the apparatus configured to sense a specific parameter including: power parameters (voltage, current), ambient parameters (temperature, humidity, motion). Sensor can be configured for interfacing to control electronics.

Solar Battery

Defined as an industry standard or available Solar Battery technology, which can be incorporated into Identification Devices, and can serve as a main power source, or in combination with other power sources—to provide electrical power to the identification device. This can significantly improve energy efficiency of Identification Devices, in particular the ones that are installed outdoors, with a sufficient exposure to ambient light sources, such as sun, Trigger Points Defined as an user set or pre-programmed level or value associated with a specific Sensor, which can be detected by Controller. Trigger Points can be stored in a non-volatile memory of Controller Controller in real-time can monitor Sensors, and detect condition when a respective Trigger Point has been reached. Controller can execute a Control Function, as programmed or set by an user, when a specific Trigger Point or combination of Trigger Points has been detected.

Drawings

Unless noted otherwise, for simplicity the physical location of the internal components of the apparatus, such as: controller; sensors; interfaces—are not shown. These components will reside inside the apparatus enclosure. For illustration purposes the plug and power distribution electrical connections are shown just before being plugged in, allowing to view the respective male and female connectors used for 12 VDC plug and power distribution. Similar type of connectors can be used for low voltage AC plug and power distribution. The visible harnesses connecting devices within an apparatus, or within an apparatus configured as a system, can be configured with colors, based on type of power and/or controls the harness is a part of. Example: Harnesses as part of regular 12 VDC plug and power distribution can be BLACK color; Harnesses as part of battery backup 12 VDC plug and power distribution can be RED color; Harnesses as part of regular low AC plug and power distribution can be BLUE color. The control interface between intelligent devices of the apparatus can be configured to include wired and wireless interfaces. The apparatus is designed to meet specifications requirements, including ambient ratings and compliance to regulations of local and national agencies. Sensors will be mounted in a location within the enclosure supporting sensor operation, or functionality. The controller of the apparatus can be installed on the same PCB as the Illumination devices, or can be installed on a separate PCB, which is interfaced to PCB containing illumination devices. The local controller will contain the drive circuitry for providing controlled power to illumination devices.

Unless noted otherwise, for simplicity the sensors for monitoring: temperature, proximity, ambient light, power available to drive the illumination devices, are not shown on the drawings. The sensors can be installed on; the same PCB as the illumination devices; on the same PCB as local controller; on separate PCB; or hard-wired by harness.

Unless noted otherwise, for simplicity the network interface, such as wireless including INTERNET, is not shown on the drawings.

Unless noted otherwise, for simplicity not all DC power distribution and control connections are shown with connectors for direct plug and power distribution, as described in this application, and described in my patents. As needed, each harness and device within apparatus can be configured to support direct DC plug and power distribution and controls, as described in this application, and described in my patents.

The plug and power interfaces allow to add a power backup battery to power the system, such as solar battery. All or selected lights within the system can have battery backup power. When the electricity is off during the power outage, the connected lights within the system will stay ON being powered by the battery. The apparatus consist of: illuminated panel; illumination components: sensors; controllers; interfaces; enclosure. Illuminated panel includes: acrylic partially translucent panel, with the backside of the panel being backlit by the illumination components.

Illumination components include: solid state illumination devices, such as LED's. Single color, or multi-color devices can be used. Illumination components direct majority of their light parallel to the backside of the illumination panel.

Sensors include: ambient light; internal temperature; power parameters voltage, current; proximity. Interfaces include: wireless, such as infra-red remote; wireless network, such as INTERNET: wireless interface to mobile devices, such as cell phones; operator interface, such as: infra-red remote.

The apparatus can be configured for general lighting, such as recess lighting installed into a number of surfaces, including: ceilings; walls; floors within a building structure indoors, or for mounting outdoors with appropriate environmental ratings.

The controller of the apparatus is connected to sensors and interface components.

The controller of the apparatus can be configured to store in its non-volatile memory trigger points for sensors, which can be set for each sensor.

Trigger points for ambient light sensor include different levels of ambient light.

Trigger points for proximity sensor include different distances of a detectable object from Trigger points for temperature sensor include different levels of temperatures within the apparatus.

Trigger points for power voltage sensor include different levels of: voltage of the power supply powering the apparatus; voltage applied to components of the apparatus.

Trigger points for current sensor include different levels of: current of the power supply powering the apparatus; current applied to components of the apparatus.

Configuration of the apparatus includes control algorithm associated with each trigger point of a sensor.

Control algorithm based on ambient light sensor includes: adjusting power to illumination devices per set trigger points of the ambient light sensor, including turning the power OFF when there is sufficient level of ambient light.

Control algorithm based on proximity sensor includes: adjusting power to illumination devices per set trigger points of the proximity sensor, including increasing the illumination intensity when an object is detected, and then going back to original setting when the object is no longer detected.

Control algorithm based on temperature sensor includes: adjusting power to illumination devices per set trigger points of the internal temperature sensor, including turning the power OFF when the temperature reached a trigger point considered too low or too high for sustaining operation of the apparatus for longevity as listed in the apparatus specifications.

Apparatus by monitoring sensors and executing control algorithms based on their status can be classified as apparatus performing self-diagnostics with the main objective to avoid premature failure, and maintain apparatus in good working condition during projected time of longevity.

Results of self-diagnostics can be communicated by the apparatus to operator via specific status of the illumination components, such as: color, blinking.

Results of self-diagnostics can be communicated by the apparatus to remote controller over wireless interface.

The apparatus can be configured as: a stand-alone independent device; a master device or as a slave device. The stand-alone configuration enables the apparatus operation independent of other devices or systems. The master configuration enables the apparatus to interface with other devices or apparatuses within a system of apparatuses. The slave configuration enables the apparatus to be interfaced and controlled by a master apparatus within a system of apparatuses. The interface between master and slave apparatuses configuration includes: wireless, wired, and combination of both.

Configuration and controls of the apparatus can be executed by remote controller over wireless interface, and the apparatus can acknowledge the command received from the host by echoing the same command back to the remote controller.

The value of trigger points and associated control algorithm are stored in controller non-volatile memory.

The value of trigger points and associated control algorithm can be stored in a remote controller, as part of "cloud" technology, and other innovations available through wireless interfaces.

The apparatus with wireless interface can be configured and re-configured remotely, by a remote controller over wireless interface network, including INTERNET.

During the initial installation, the apparatus is configured per requirements of the local ordinances, which can include: maximum power consumption; limits of illumination power; requirement to use ambient light sensor to control illumination.

Each LED light described in this application can be configured with light diffusing component, and with light deflecting or light retaining component, which for simplicity, are only shown on selected drawings. Light diffusing component are configured to provide specified amount of diffusion of the light shining through their surfaces. Light deflection or light retaining components are configured to direct maximum amount of parallel light produced by LED's toward the illuminated panel of the LED light.

The principals, technology and methods of controls illustrated in the drawings and described in the specifications, are compatible with respective principals, technology and methods of controls described in my other patents and patent pending applications, including the ones listed below:

U.S. Pat. No. 8,341,837 "Modular Power Distribution and Control System";

U.S. Pat. No. 8,099,261 "Low-cost Solid-state Identification Device";

Patent pending U.S. Ser. No. 13/731,103 "Plug and Power Distribution and Control Apparatus";

Patent pending U.S. Ser. No. 14/455,928 "Apparatus Intelligent LED Illuminated Sign, Methods of Configuration and Controls";

Patent pending U.S. Ser. No. 14/475,911 "Apparatus Real Time Control and Navigation System Using Networked Illuminated Signs Improving Safety and Reducing Response Time of First Responders".

For simplicity, the word "patents" is used in this application for referencing the above patent and patent pending applications.

For simplicity the phrase "plug and power distribution" applies to principals and methods described in this application, and as described in my patents.

For simplicity, DC power sources and DC plug and power distribution methods are illustrated in this application. Similar methods and principals will apply to utilization of low power AC power sources and power low AC plug and power distribution methods.

For simplicity, not all power sources required to power various devices within or outside of the apparatus, are shown. Example: power input source for local host computer or controller not shown; power input source for remote controller is not shown.

The illustrations of the apparatus configurations are designed for the apparatus to be used for a variety of applications, including: general lighting; task lighting; spot lighting; stand-alone lamps. For number of applications, additional accessories to direct the light produced by the apparatus will be added, which are not shown for simplicity.

Example 1 of an optional accessory—light reflecting overhang over a wall mount parallel view LED light, directing the light from the apparatus toward an area underneath the light, as required for providing illumination of an area below.

Example 2 of an optional accessory—light reflecting dome over a stand-alone desk lamp fixture using parallel view LED light, directing the light from the apparatus toward an area underneath the light, as required for providing illumination of an area below.

The apparatus can be configured to contain multiple apparatuses with each of the apparatus having the same or different configuration, and the configuration referenced as a system.

The apparatus is designed to meet specifications requirements, including ambient ratings and compliance to regulations of local and national agencies.

The at least one controller can be configured to execute system control algorithm. The system control algorithm includes interface between the at least one controller and the at least one solid-state light source. The at least one configurable interface includes configuration of a local area network. The system control algorithm includes configuration maintaining operation of the apparatus within the at least one acceptance criteria. The at least one acceptance criteria includes configuration criteria for a device within the apparatus. The devices include the at least one configurable light source. The system comprises of devices of the apparatus, and the system including the at least one controller, the at least one configurable light source, and the interface network. The at least one acceptance criteria includes configuration of a system acceptance criteria for the apparatus. The system acceptance criteria include configuration requiring the system to execute coordinated control of the devices within the apparatus. The configuration of the system acceptance criteria include: parameters maintaining the operation of the system within system specifications; providing real-time illumination of designated areas; controlling designated devices within the system to provide visual affects representing status of the system; communication protocol between controllers of the system. The system acceptance criteria include configuration optimizing illumination as function of ambient environment. The system acceptance criteria include configuration optimizing use of power resources as function of connected power resources and the status of ambient environment. System control algorithm including configuration maintaining operation of the apparatus within acceptance criteria. The apparatus is installed in a community, and the community definitions include: an area within a city; a condominium complex; an apartment building.

FIG. 1 illustrates 3D view example of an apparatus (1) configured as a parallel view LED light with a single LED assembly (4) along one side of the top. All parallel view LED lights described in this application, can be configured to include: light retaining, light reflection, and light diffusion components. The main purpose of these components is to maximize use of the illumination generated by the parallel view LED's toward the surface intended to be illuminated. The inner surfaces of the enclosures of parallel view LED light can be configured or designed to provide required levels of light retention and reflection. As needed, the enclosure of the apparatus can be configured with additional components, including light reflecting surfaces such as mirror surfaces, can be added. The apparatus (1) will be configured with a power and control interface compatible with plug and power distribution, as described in this application and as described in my patents. For simplicity not all components are shown. The apparatus components are labeled as follows:

2—Illuminated surface of the top assembly (3B) of the apparatus, which is configured with a dome. The configuration with a dome can find its application as a recessed parallel view LED light installed in the ceilings of residential and commercial buildings. This configuration as a recessed mount parallel view LED light can also be installed into other surfaces, including applications for: building walls, furniture, appliances, devices.

3—Enclosure of the apparatus configured with a rectangular base assembly (3A) and a rectangular top assembly (38) with a section formed as a dome. The enclosure can be configured to other shapes, as needed. The enclosure configurations will include: round base and top assemblies with and without a dome; square base and top assemblies with and without a dome.

4—LED assembly configured as flex LED strip adhered or attached to the inner side of the top (38) as shown.

5—Direction of illumination provided by LED assembly (4), which is in-parallel to the top surface of the top assembly (38), and the dome (2)

Figure 2:
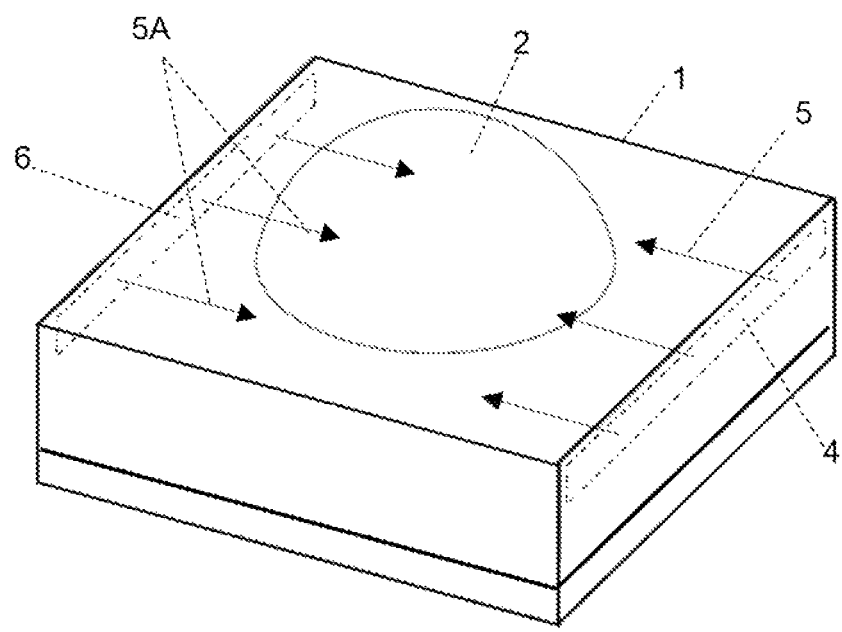

FIG. 2 illustrates 3D view example of an apparatus (1) shown on FIG. 1 which is configured as a parallel view LED light with two LED assemblies on the opposite sides of the top. The apparatus components are labeled as follows:

2—Illuminated surface of the top of the apparatus

4—LED assembly configured as flex LED strip adhered or attached to the inner side of the top as shown 6—LED assembly configured as flex LED strip adhered or attached to the inner side of the top opposite to (4), as shown 5—Direction of Illumination provided by LED assembly (4), which is in-parallel to the dome (2) of the top assembly (3B)

5A—Direction of illumination provided by LED assembly (6), which is in-parallel to the dome (2) of the top assembly (3B)

FIG. 3 illustrates 3D view example of an apparatus (1) shown on FIG. 1 which is configured as a parallel view LED light with an LED assembly (7) on adjacent sides of the top.

The apparatus components are labeled as follows:

2—Illuminated surface of the top of the apparatus

7—LED assembly configured as flex LED strip adhered or attached to the inner sides of the top as shown 5—Direction of illumination provided by one section of the LED assembly (7), which is in-parallel to the dome (2) of the top assembly (38)

8—Direction of illumination provided by the other section of the LED assembly (7), which is in-parallel to the dome (2) of the top assembly (3B)

Figure 4:
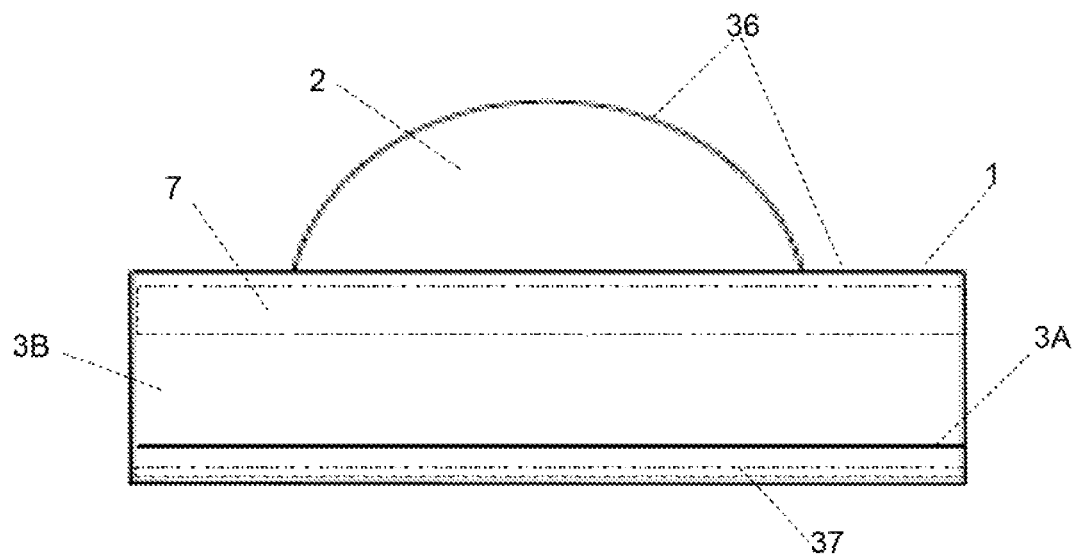

FIG. 4 illustrates side view example of an apparatus (1) shown on FIG. 3 which is configured as a parallel view LED light with an LED assembly (7) on adjacent sides of the top. The apparatus components are labeled as follows:

2—Illuminated surface of the top of the apparatus

3A—Base assembly of the enclosure of the apparatus

3B—Top assembly of the enclosure of the apparatus

7—LED assembly configured as flex LED strip adhered or attached to the inner sides of the top as shown 36—Light diffusing component, which is considered being a property of the illuminated surface (2).

Examples of light diffusing component include translucent plastics, such as acrylic, which have properties of diffusing the light shining through their surfaces.

37—Light deflecting or light retaining component, which is shown to be installed inside the bottom portion of the Base assembly (38). Examples of light deflecting or light retaining component include non-conductive reflective mirror-like materials, which reflect the light shining at them. The type and location of the light deflecting or light retaining component can vary inside the apparatus enclosure, with the main objective to direct maximum amount of parallel light produced by LED's toward the illuminated panel (2)

Figure 5:
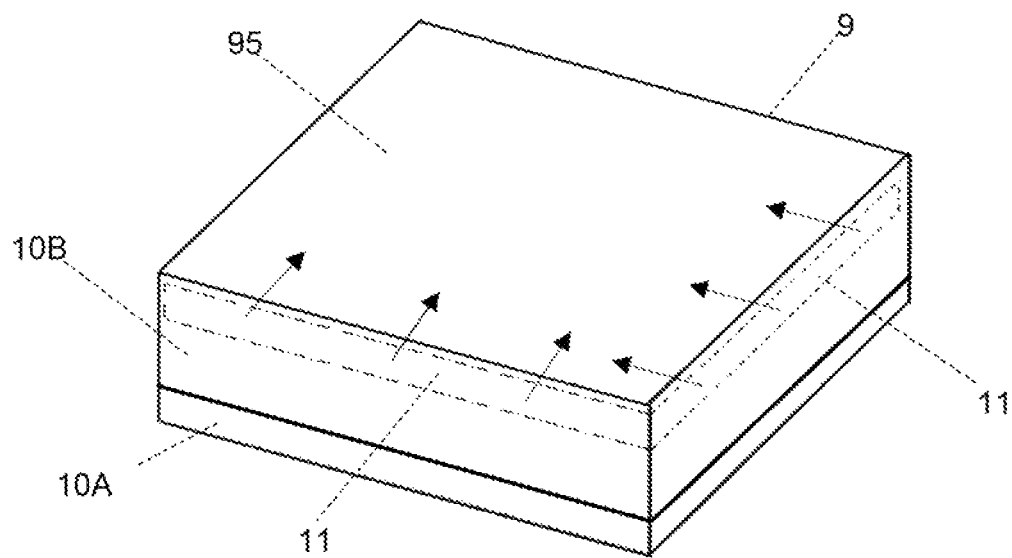

FIG. 5 illustrates 3D view example of an apparatus (9) configured as a parallel view LED light with a single LED assembly (11) installed along adjacent sides of the top assembly (10B). The direction of the parallel view illumination produced by LED assembly (11) is indicated by the arrows. The apparatus components are labeled as follows:

10A—Bottom assembly of the enclosure of the apparatus

10B—Top assembly of the enclosure of the apparatus, which is configured with a flat top surface. This configuration allows the apparatus (9) to be used in a variety of applications, including: backlighting illuminated panels either embedded into the front surface (95), or attached to the front surface (95) of the top assembly (10B), or placed in-front of the (95). The illuminated panel (not shown for simplicity) can be configured with embedded art, including symbols, characters.

11—LED assembly configured as flex LED strip adhered or attached to the adjacent inner sides of the top assembly (10B) as shown.

Figure 30:
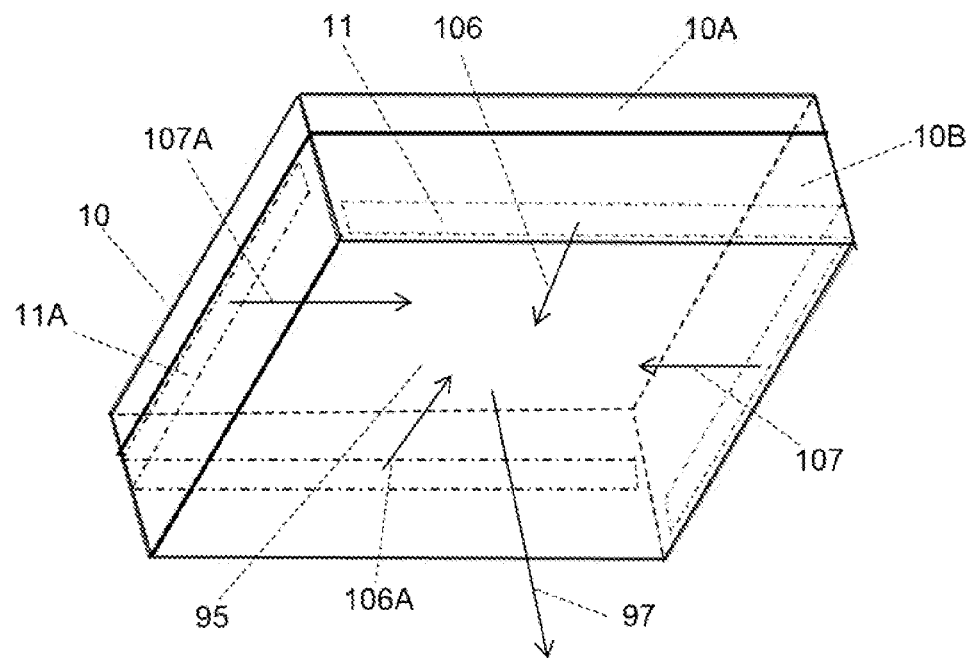

The 3D view of this configuration of the apparatus (9) is illustrated also on FIG. 30, where the orientation of the top (10B) and bottom (10A) assemblies corresponds to the mounting of the (9) as a parallel view LED light illuminating the area underneath the light.

Figure 6:
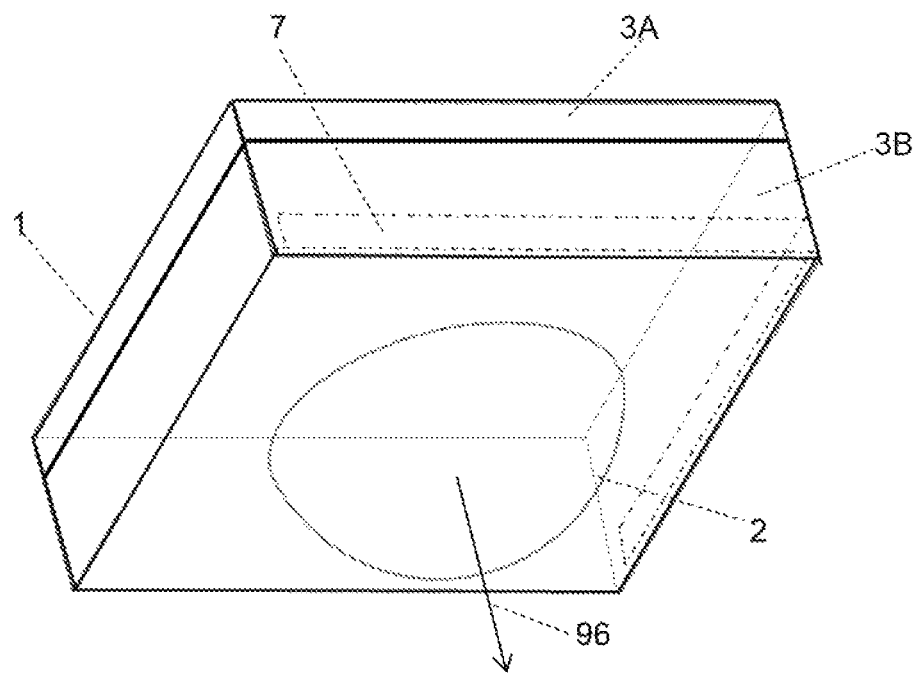

FIG. 6 illustrates 3D view example of an apparatus (1) shown on FIG. 3 with the top Illuminated surface facing down. This configuration can be used for recessed LED lighting installed in the ceiling. Components are labeled same as on FIG. 3

Figure 7:
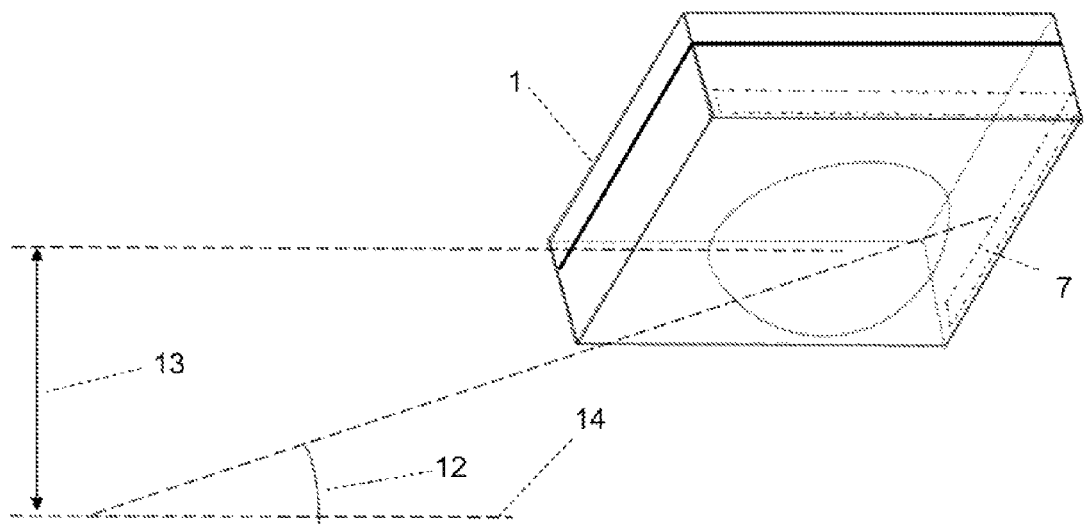

FIG. 7 illustrates example of a 3D view of an apparatus (1) shown on FIG. 6 with dimensional requirements to ensure the discrete LED's of the LED assembly (7) as source of parallel illumination are not in direct view by an observer looking up.

Figure 8:
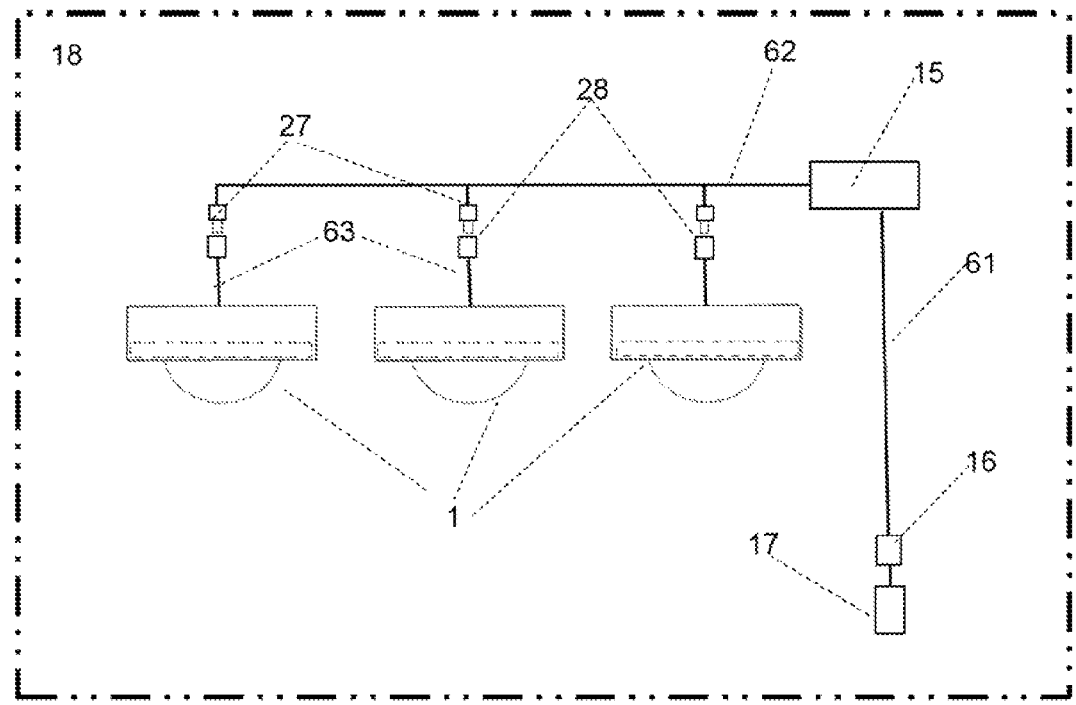

Components are labeled as follows:

12—Minimum angle from which the discrete LED's of the LED assembly (7) are not visible 13—Minimum height reference between observer and the apparatus (1) from which the discrete LED's of the LED assembly (7) are not visible 14—Floor reference FIG. 8 illustrates a diagram of an apparatus (18) configured as a system. Components are labeled as follows:

1—Individual LED lights, which for example can be recessed mounted into a ceiling for illuminating a room 15—DC power supply, such as 12 VDC, providing DC power to LED lights of the apparatus via plug and power DC distribution harness (62). DC power supply can be standard power supply approved by respective agency, such as NEC, UL. The power supply can be configured with controller, which can be further configured to regulate output voltage supplied to LED lights based on status of the signal provided by sensor (16). For simplicity, the input power required for the power supply to operate according to its specifications, such as AC or DC, is not shown for simplicity.

16—Sensor, such as ambient light sensor, or proximity light sensor, or combination of, connected to the power supply (15) via harness (61), and providing a signal to the power supply to control the power applied to LED lights (1).

17—Manual switch, which can be installed into a wall, which is connected to the power supply (15) via harness (61), and allowing operator via power supply (15) to turn the LED lights ON or OFF. The switch can be configured with dimmer slider to control level of power or light intensity generated by LED lights (1). The harness (61) can be configured for DC plug and power distribution and controls, as described in this application, and described in my patents.

62—Harness with male DC plug (27) to provide DC plug and power distribution, as described in this application, and in my patents, from the power supply (15) to LED lights (1). The harness can be configured for DC plug and power distribution, as described in this application, and in my patents, to the power supply (15) as well.

Figure 9:
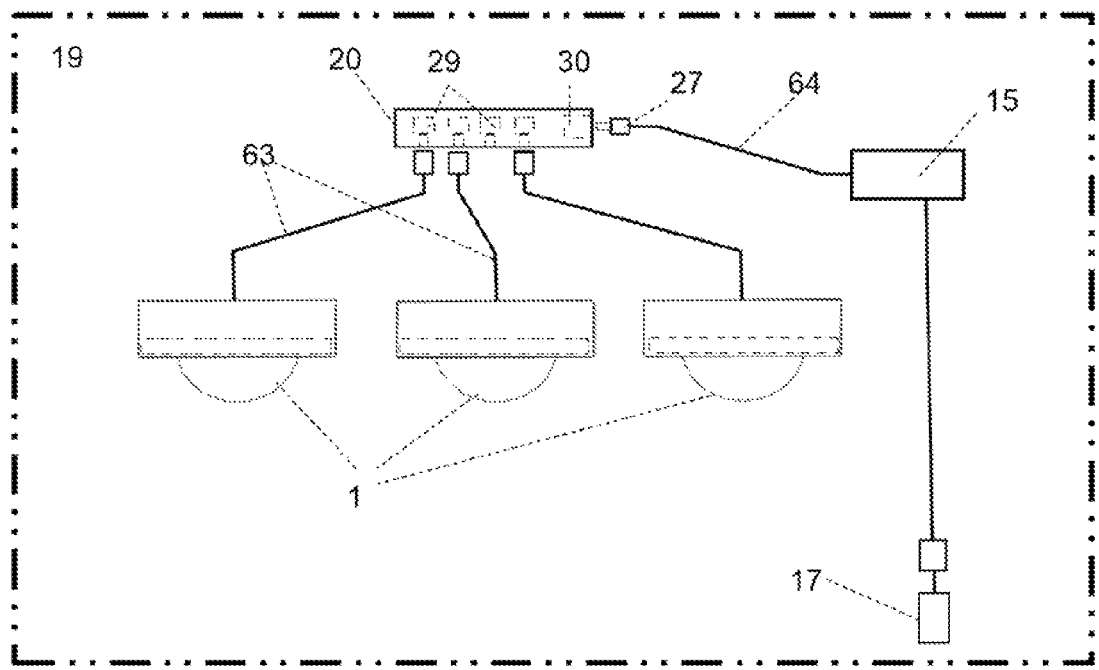

63—Harness of the LED light (1) with a female DC jack (28) to plug into mating DC plug connector (27) of the harness (62), as part of the plug and power distribution and controls from the power supply (15), as described in this application, and in my patents FIG. 9 illustrates a diagram of an apparatus (19) configured as a system, which is based on to the system described on FIG. 8, with addition of plug and power DC distribution strip (20) replacing the harness (62). Components are labeled as follows:

20—DC plug and power distribution strip compatible with DC plug and power distribution system and controls, as described in this application, and described in my patents.

29—Male outlets of the (20) providing plug and power DC output connections. As shown, the harnesses (63) from each of the LED lights (1) has its female connector (28) plugged into respective male outlets of (20), providing DC power from (20) to each of the connected LED lights (1).

30—Female receptacle of the (20) providing plug and power DC input connection. As shown, the harness (64) from the power supply (15) via plug and power male connector (27) is plugged into the female receptacle (30), providing DC power to (20).

Remaining components are labeled same as on FIG. 8

Figure 10:
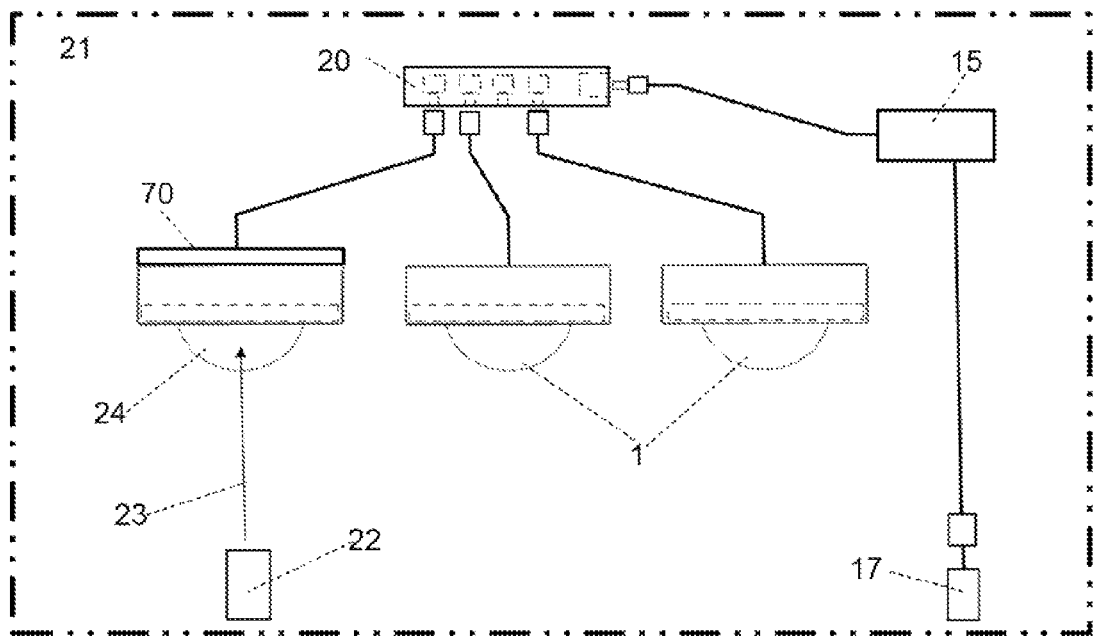

FIG. 10 illustrates a diagram of an apparatus (21) configured as a system, as shown on FIG. 9 with one of the LED lights (24) upgraded with an optional add-on LED controller module (70) to enable remote control by an operator via remote controller (22). Components are labeled as follows:

22—Remote controller, including infra-red, which can be used by an operator to control illumination parameters of the LED light (24). When controller (22) is configured as an infra-red device, the communication line or direction toward the LED light (24) is indicated by (23). Remote controller can be configured with wireless interface to match configuration of the remote interface of the LED controller module (70) installed in the LED light (24).

24—LED light configured with optional LED controller module (70), which is further configured with operator wireless interface.

70—LED controller module, which in this example is configured with wireless infra-red interface to allow operator using infra-red remote controller (22) to send control signals to (70) in direction indicated by (23), as an example. The infra-red interface will allow operator to use (22) within specified distance from (24) and within specified angle of direction in respect to (70). The LED controller module can be configured to control variety of illumination parameters, including: power ON/OFF; Illumination intensity UP/DOWN; color selection, when color LED's are installed in the (24); illumination effects, such as: changing intensity, blinking, etc. As with all controllers described in this application, the LED controller will be configured to apply controls in accordance with the control algorithm defined for the apparatus, and will never exceed specification limits of LED devices and any devices of the apparatus, with an objective to sustain their safe operation and maintain reliability of the apparatus per specifications.

Other components are labeled same as on FIG. 9

Figure 11:
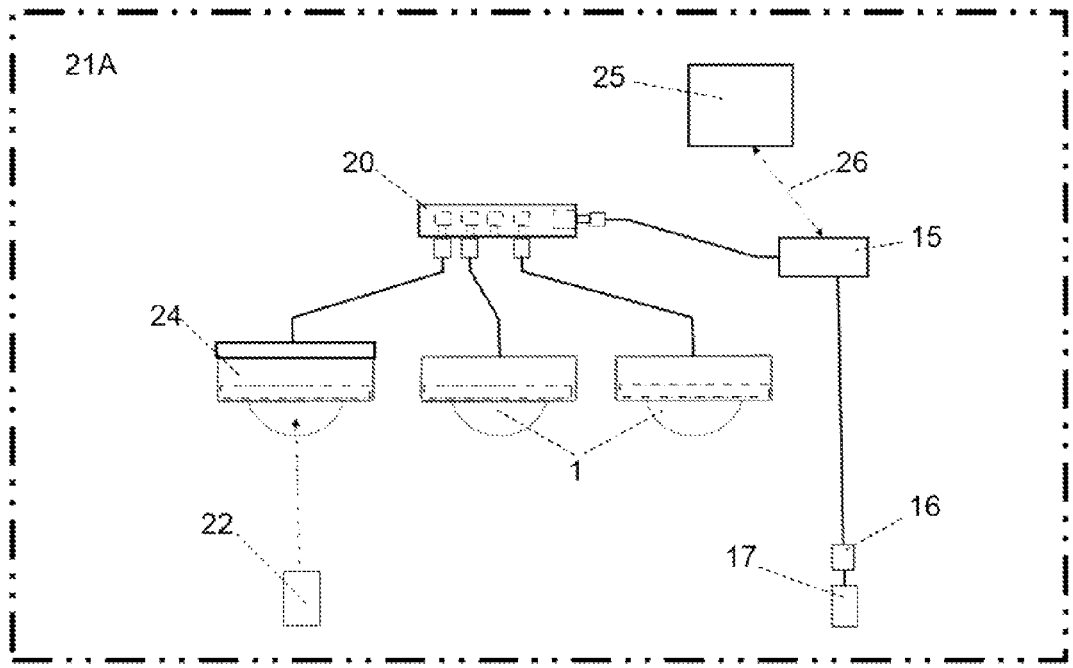

FIG. 11 illustrates a diagram of an apparatus (21A) configured as a system, as shown on FIG. 10 with addition of a local host controller (25), which is configured to monitor and control operation of the power supply (15) over wireless interface (26). The host controller (25) can be configured to store in non-volatile memory configuration of the system, including trigger point settings of the sensors, such as (16), within the system. The host controller (25) can be further configured to store in non-volatile memory control algorithm for the system, which is specifically configured for the power supply (15). Control algorithm can include: regulating of the DC power applied to LED lights as function of status of ambient light and/or proximity sensor (16). Other components are labeled same as on FIG. 10

Figure 12:
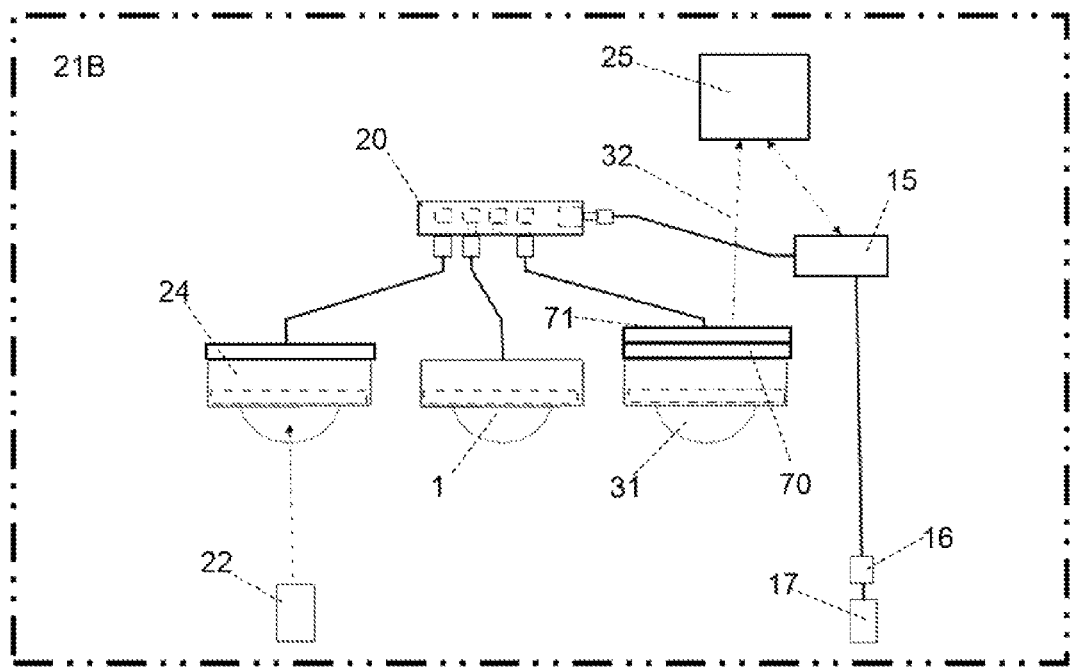

FIG. 12 illustrates a diagram of an apparatus (218) configured as a system, as shown on FIG. 11 with addition of LED light (31). Components are labeled as follows:

31—LED light, which is configured with add on LED controller (70), described on FIG. 10, and add on wireless interface module (71), which is connected to the local host controller (25) via wireless interface connection (32). The add on wireless interface module (71) can be configured to include sensors (not shown for simplicity), which can be configured for monitoring ambient parameters surrounding LED light (31), including: temperature, humidity, power consumption, supplied level of DC voltage connected to (31). The add on wireless interface module (71) can be further configured to include embedded controller (not shown for simplicity), which will monitor the status of the sensors and execute controls based on their status. The configuration of the trigger point settings and control algorithm can be stored in the non-volatile memory of the embedded controller. The wireless interface module will provide connection between the embedded controller of the (71) and the local host controller (25), which can be used by the host controller to monitor status of the embedded controller, and execute control algorithm of the system based on the status of embedded controller of (71) and based on status of other sensors, such as (16), of the system (21B). The wireless interfaces include: LAN, INTERNET.

The remaining components are labeled same as on FIG. 11

Figure 13:
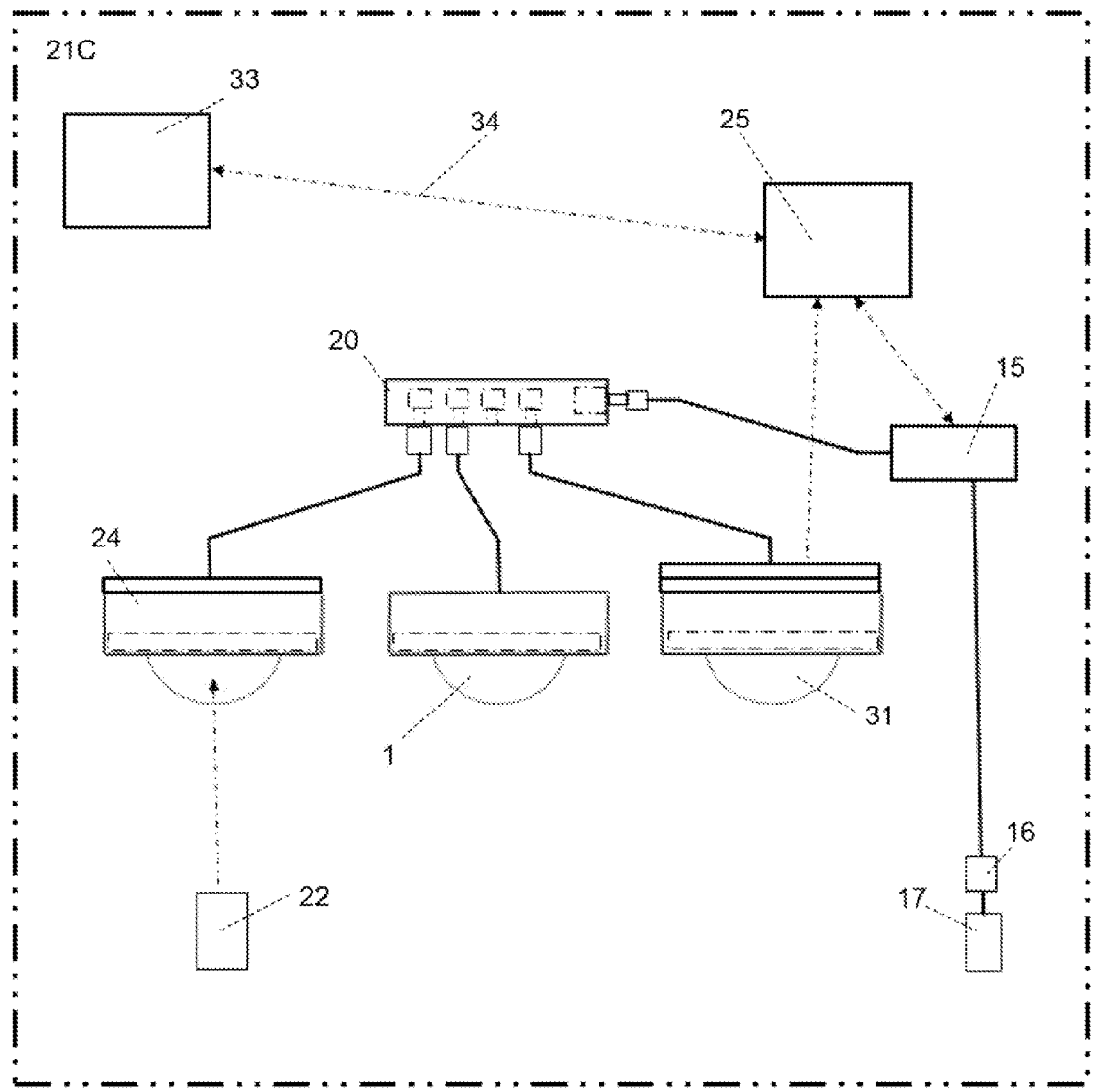

FIG. 13 illustrates a diagram of an apparatus (21C) configured as a system, as shown on FIG. 12 with addition of a remote controlled (33), which is connected to the local controller (25) via wireless interface (34). The remote controller (33) can be configured to provide supervisory controls over the apparatus (21C). The local controller (25) can communicate self-diagnostics data of the apparatus to (33) over (34). Configuration and controls of the apparatus (21C) can be executed by remote controller (33) over wireless interface (34) to local controller (25), and the apparatus (21C) can acknowledge the command received from the host (33) by (25) echoing the same command back to the remote controller (33).

The value of trigger points and associated control algorithm are stored in controller (25) non-volatile memory.

The value of trigger points and associated control algorithm can also be stored in a remote controller (33), as part of "cloud" technology, and other innovations available through wireless interfaces. The apparatus (21C) with wireless interface (34) can be configured and re-configured remotely, by a remote controller (33) over wireless interface network (34), including INTERNET.

The remaining components are labeled same as on FIG. 12.

Figure 14:
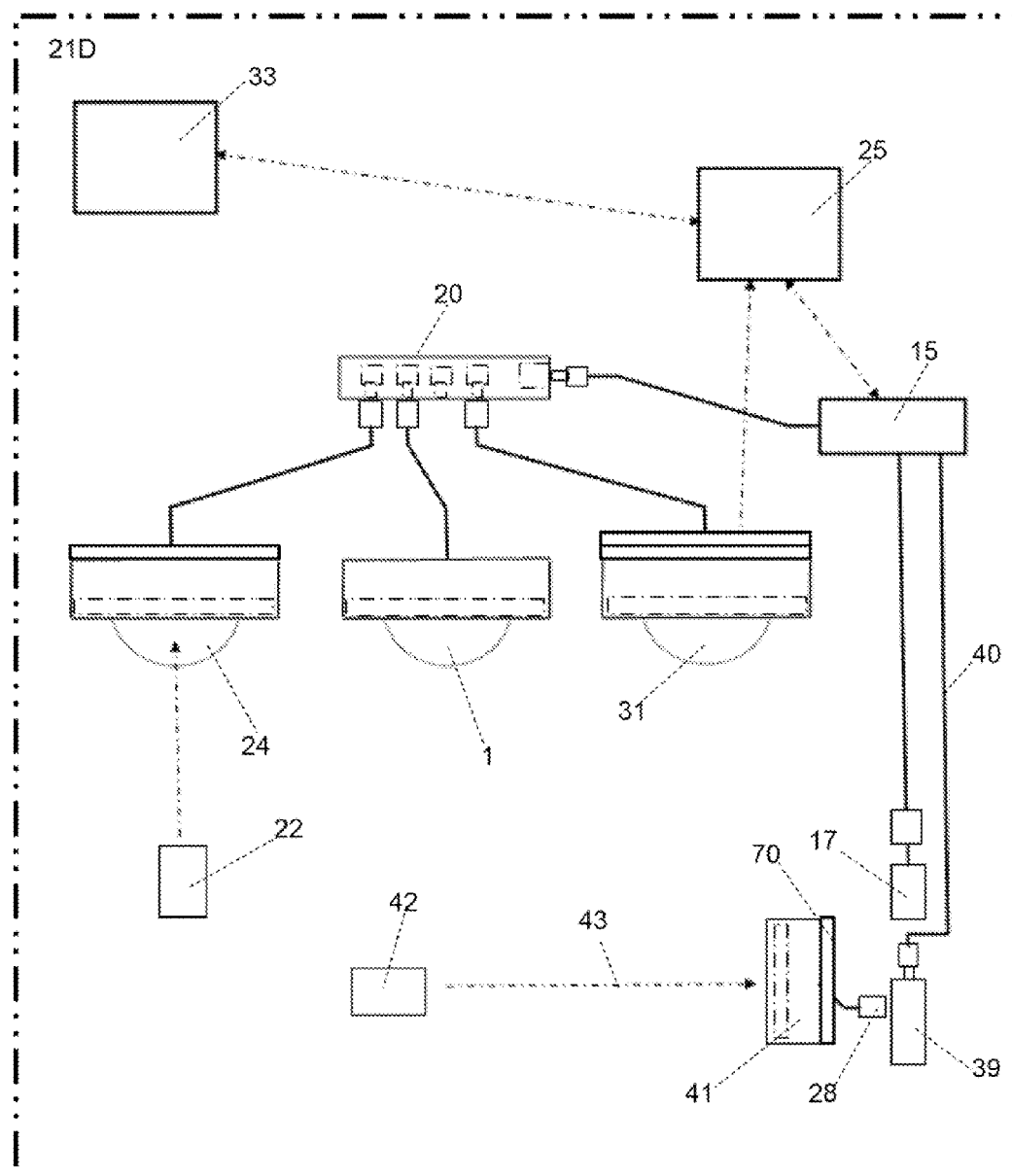

FIG. 14 illustrates a diagram of an apparatus (21D) configured as a system, as shown on FIG. 13 with addition of several components as described in this application, and below. Components are labeled as follows:

39—DC plug and power receptacle, which is configured with male DC power plugs for providing plug and power DC distribution for the components of the system. As shown, the (39) is providing DC power to LED light (41), which is connected to (39) via female jack (28) of the power cable connected to (41).

41—LED light configured with add on LED controller module (70), which enables the (41) to be controlled via remote controller (42) via wireless interface (43).

The remaining components are labeled same as on FIG. 13

Figure 15:
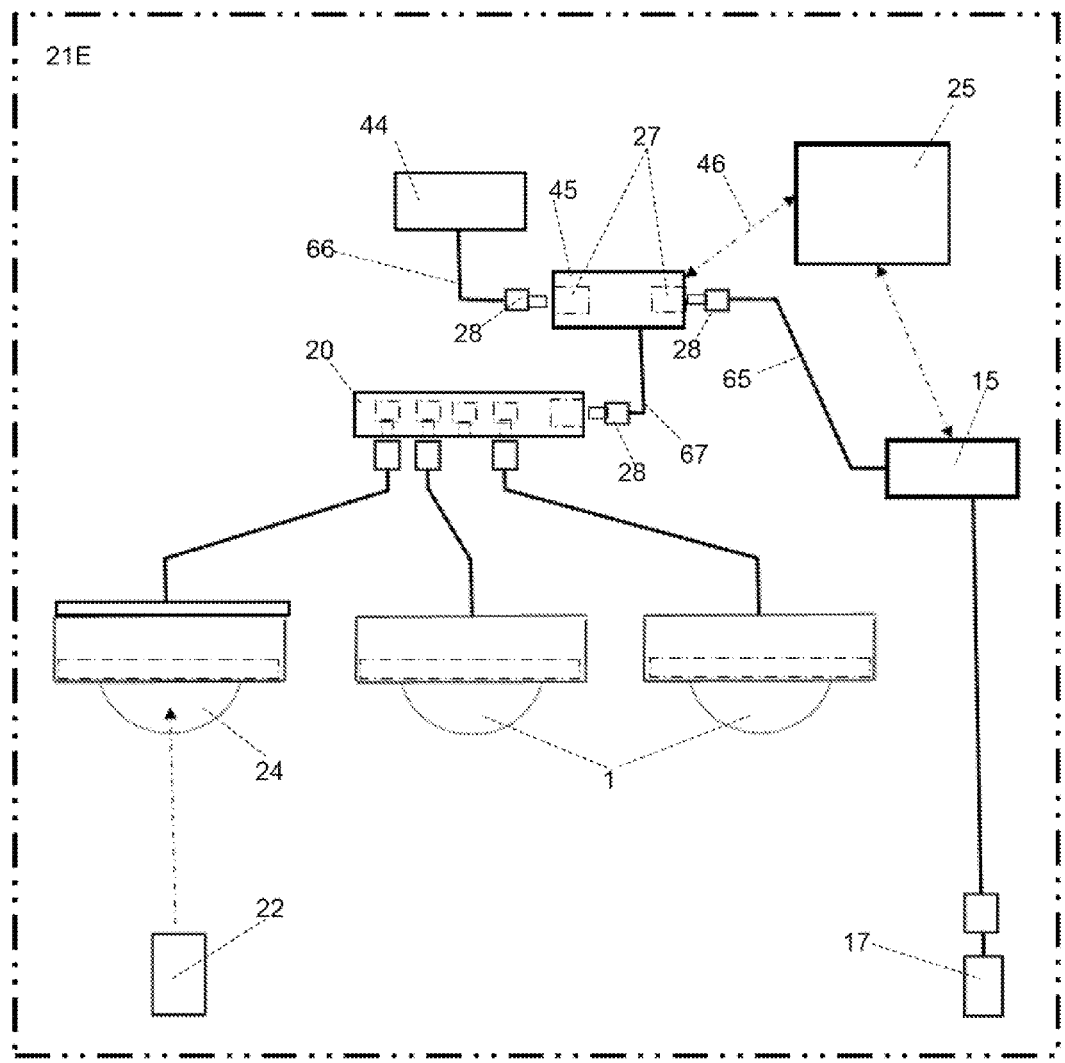

FIG. 15 illustrates a diagram of an apparatus (21E) configured as a system, as shown on FIG. 13, with addition of components as described in this application, and below.

Components are labeled as follows:

44—Battery backup power source, which is rated and compatible with power used by apparatus (21E).

Batter backup power source can be configured as a solar battery, which can be located at a location where it will collect and store energy during the day time, which will be available during power outages, and as needed. The power output from the battery backup source (44) is compatible with plug and power distribution described in my patents. As shown, the power cable (66) from the battery power source is connected via harness (66), and the end of the harness configured as a male DC plug (28), is connected to the mating female DC jack (27) of the power splitter (45).

45—Power splitter device, as described in this application, and in my patents. The power splitter (45), as shown, is configured as an intelligent device with a wireless interface (46) connecting the splitter (45) to the local host controller (25). The power splitter (45) is further configured to accept input power from two independent power sources, which can be connected to the splitter input DC female jack connectors (27). As shown, the power supply (15) is connected to the power splitter (45) via harness (65) and male connector (28) into input power female connector (27) of the power splitter (45), and then the battery (44) is connected via harness (66) and the male connector (28) to the other input power female connector (27) of the splitter (45). Then the power output from (45) via harness (67) and male connector (28) is connected to the input power female connector of the power strip (20). The host controller (25) can control power splitter (45) allocating or selecting any of connected input power sources, (15) or (44) in this case, to the splitter (45), and to provide power to the connected loads, which as shown, represent LED light (24), LED light (1), and another LED light (1). The power splitter (45) can be configured by the controller (25) to switch automatically in real-time from the power supply (15) to the battery (44), when the power supply (15) has no power output going to splitter (45), or the power produced by (15) is not sufficient or below specified level. The power splitter (45) can have each input power port labeled, reflecting the power source function. As illustrated in the drawing, the port of (45) connected to power supply (15) would be labeled: "power supply", and the other input power port connected to the battery (44) power source, would be labeled "battery", while the power output port will be labeled as "output". Under normal operating conditions, the power splitter (45) will be configured to connected "power supply" to the power output port. The controls of the power splitter (45) as described in this application, and in my patents, includes the following examples.

Example #1: partial loss of electricity providing power to the power supply (15), may cause power supply (15) to drop power output voltage and current ability. Intelligent power splitter device (45), as described in this application, and in my patents, will detect the condition, and switch the output power to be connected to the "battery" power source. In addition, the intelligent power splitter (45) can be configured to monitor power parameters of the "battery", and adjust the "output" power in order to prolong time of using "battery" as a backup power source. The regulation of the outputs controlled by the (45) can include: lowering or limiting the current consumption by the output devices connected to "output".

Example #2: complete loss of electricity providing power to the power supply (15), will cause power supply (15) to drop power output voltage and current. Similarly, as described in this application, and in the example #1 above, the intelligent power splitter (45) will switch the "output" to "battery". The local controller (25) can have sensors, monitoring power input supply to (25), and detect condition when the input power supply to (25) is out of specifications. The local controller (25) can have additional sensors, monitoring power, such as AC main power, within a designated area where apparatus is installed, and detect condition when the power is out of specifications. The controller (25) can be configured with its own power backup battery, and maintain its controls during partial or complete loss of electricity, while the backup battery is providing sufficient power to the controller. The controller (25) can be connected to battery power source (44) via power splitter (83) as shown on the next FIG. 16.

The remaining components are labeled same as on FIG. 14.

Figure 16:
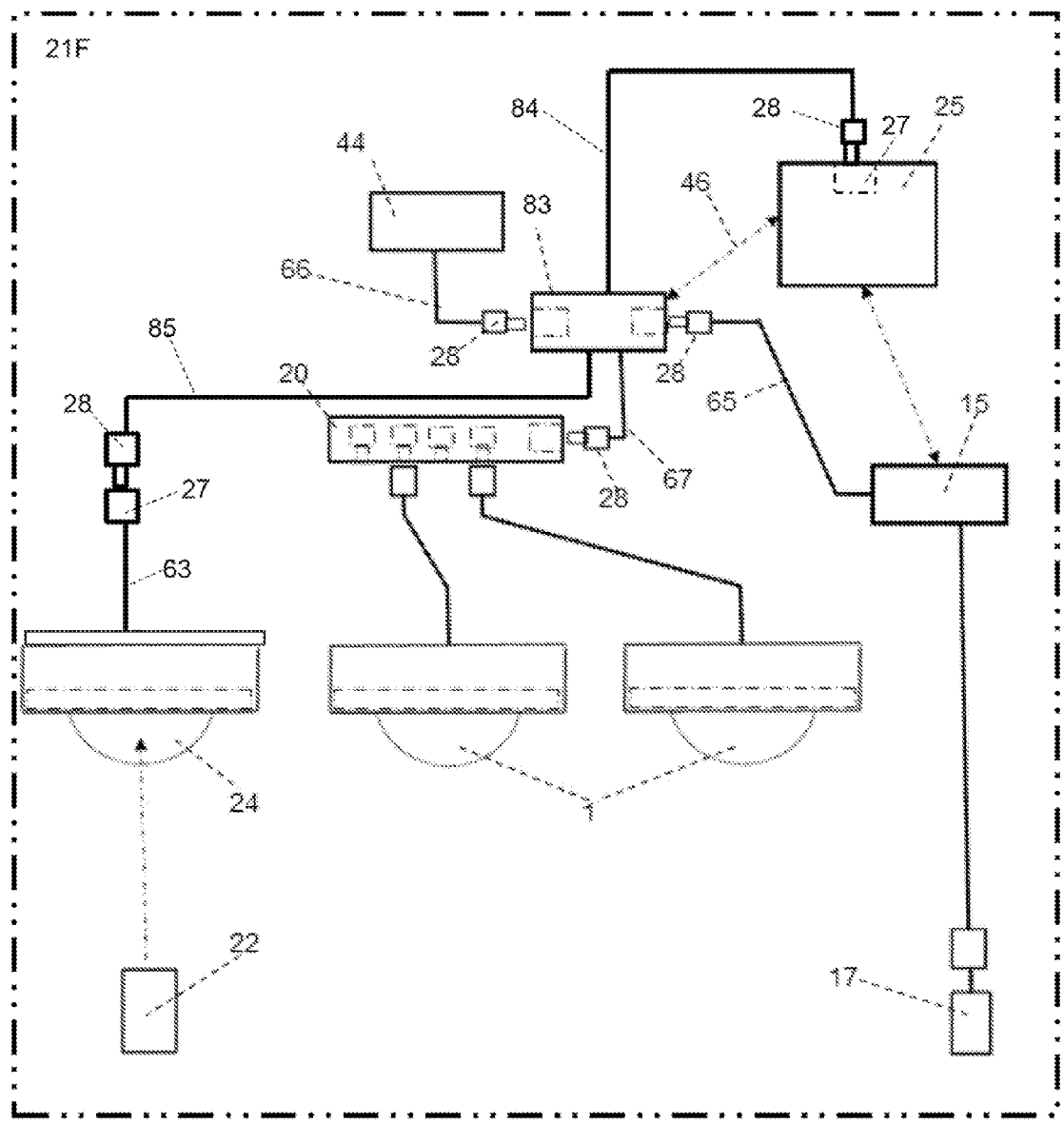

FIG. 16 illustrates a diagram of an apparatus (21F) configured as a system, as shown on FIG. 15, with an intelligent power splitter (83) as described in this application, and below.

Components are labeled as follows:

83—Power splitter device, as described in this application, and in my patents. The power splitter (83), as shown, is configured as an intelligent device with a wireless interface (46) connecting the splitter (83) to the local host controller (25). The power splitter (83) is further configured to accept input power from two independent power sources, and provide output power to three independent devices, as described in this application, and in my patents. Similarly as described in this application, and for FIG. 15, the input power female DC jack connections for the (83) can be labeled: "power" and "battery", while the output power male DC plug connections can be labeled as "output 1", "output 2", and "output 3". In addition to the apparatus configuration on FIG. 21E, the "output 2" of the (83) is connected via harness (84) and male DC plug connector (27) to the DC power input female jack connector of the local host controller (25), and the "output 3" of the (83) is connected via harness (85) and male DC plug connector (28) to the DC female jack (27) of the harness (63) providing power to the intelligent LED light (24). The control algorithm configured for (25) can include:

a) Configuration of (83), when the "power" input is out of specifications, include controls to automatically switch only power outlets "output 1" connecting the local host controller (25), and "output 3" connecting the LED light (24), from "power" input to "battery" input;

b) Configuration of (83), when the "power" input is out of specifications, to include controls based on "battery" input power to automatically switch only power outlet "output 3" connecting the LED light (24) to "battery" input, maintaining only operation of LED light (24) as an emergency light during this condition, and in addition controlling power "output 3" and extending illumination provided by (24) for as long as the "battery" power is within designed specifications;

c) Configuration of (83) when the control sequence of (83) starts with controls described by (a) when the "input" is out of specifications by a small margin, and then continues with (b) when the "input" falls further out of specifications by a larger margin.

Configurations and control algorithms of the power splitter (83) are stored within non-volatile memory of the embedded controller of (83), as described in this application, and described in my patents.

The remaining components are labeled same as on FIG. 15.

Figure 17:
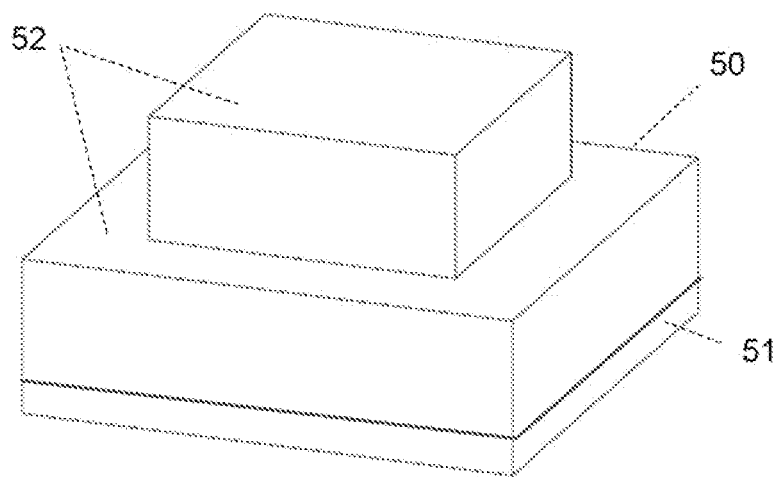

FIG. 17 illustrates example as a 3D view of an apparatus (50) configured as a parallel view LED light with a rectangular top assembly (52), and a rectangular base assembly (51).

Figure 18:
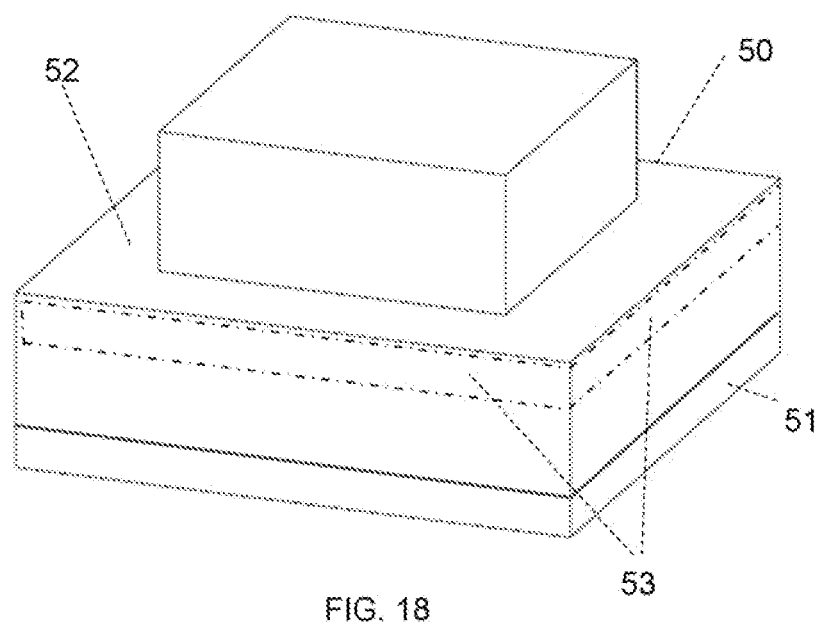

FIG. 18 illustrates 3D view example of an apparatus (50) shown on FIG. 17, which is configured as a parallel view LED light with a rectangular top assembly (52) and base (51). The LED assembly (53) is installed along adjacent sides of the top (52). The direction of the parallel view illumination produced by LED assembly (53) is parallel to the top surfaces of (52).

Figure 19:
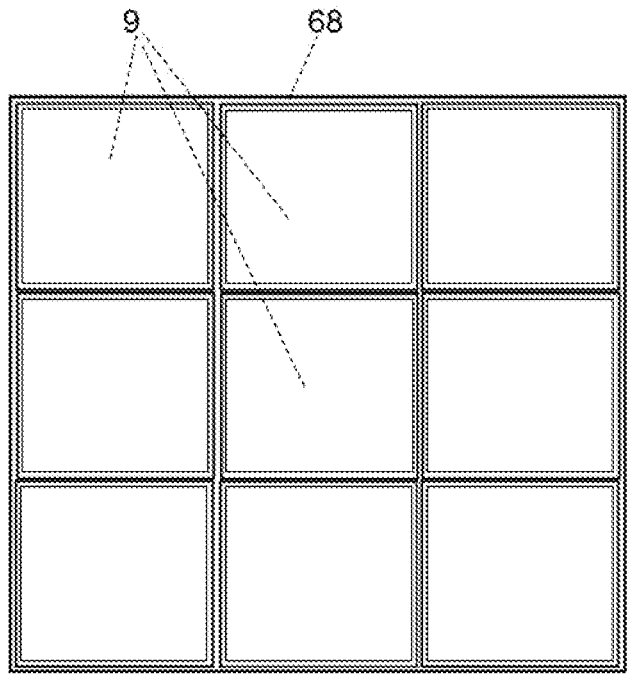

FIG. 19 illustrates front view example of an apparatus (68) configured as a system consisting of nine parallel view LED light modules (9) described on FIG. 5. The AC/DC power distribution for the system (68, and within the system (68), is based on plug and power method described in this application, and as described in my patents. The system can be configured with: central controller; local controller; sensors; power supplies; battery backup power; power splitter; which are described in this application, and for simplicity, are not shown. The system controls can be configured to provide individual control of each module (9) independent of other modules, or centralized control of all modules (9). The system local controller can be configured with wireless interface, allowing controls by a remote controller. Each individual parallel view LED light (9) can be configured with add-on control and interface modules, as described on FIG. 25 through FIG. 27. The system configuration can be used for creating a billboard. The number and layout of parallel view LED lights can vary. When the apparatus is configured to be used as a billboard, the main advantages compared to existing billboards include: parallel view of the light generated by parallel view LED light modules, which is more pleasant to the observer looking at the billboard; ability to create large scale parallel view billboards using plug and power parallel view LED lights, such as (9); ability to configure LED light modules with optional add-on features, such as; wireless remote controls, sensors for self-diagnostics. Selected parallel view LED lights can be connected through power splitter to battery backup, such as solar battery, and retain their operation during power outage.

Figure 20:
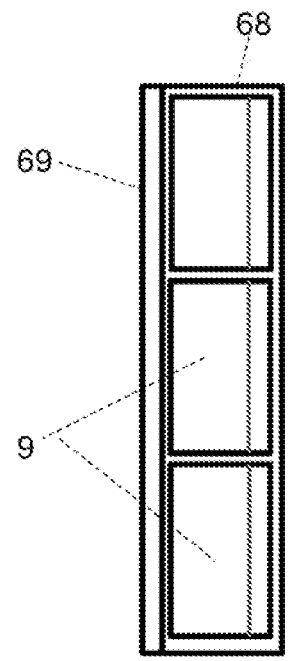

FIG. 20 illustrates side view of the apparatus (68) shown on FIG. 19, with addition of illuminated component (69). The illuminated component (69) is configured for being placed in-front of the (68) and being backlighted by the parallel view LED light modules (9). The illuminated component (69) can be configured as a transparent panel with embedded or attached elements, including: art, characters, symbols. The configuration parameters of the (69) include: level of transparency, which can be apply to the entire panel, or selected sections; dimensions of the panel.

Figure 21:
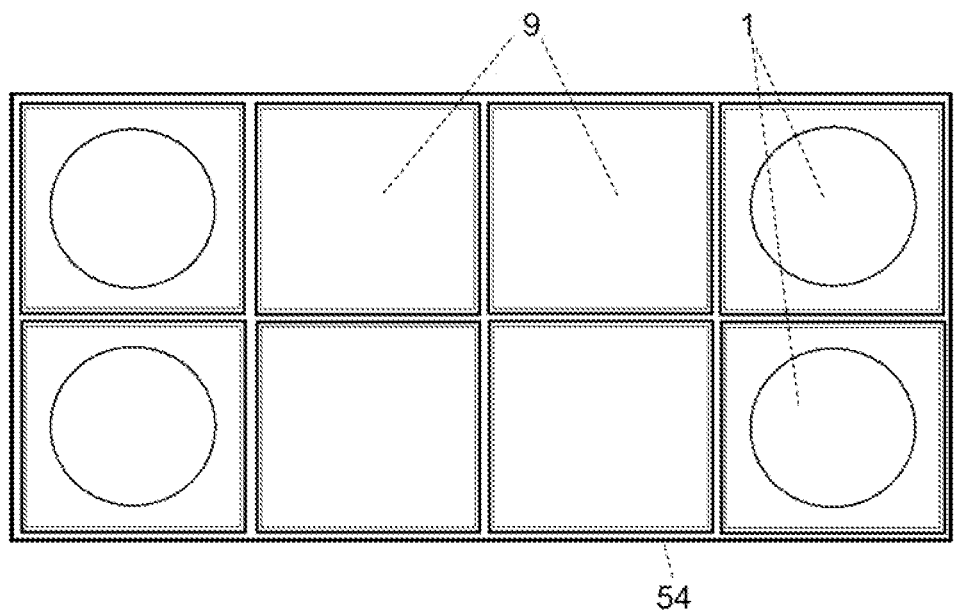

FIG. 21 illustrates front view example of an apparatus (54) configured as a system consisting of four parallel view LED light modules (1) described on FIG. 1, and four parallel view LED light modules (9) described on FIG. 5. The AC/DC power distribution for the system is based on plug and power method described in this application, and as described in my patents. The system can be configured with: central controller; local controller; sensors; power supplies; battery backup power; power splitter; which are described in this application, and for simplicity, are not shown. The system controls can be configured to provide individual control of each module (1), (9) independent of other modules, or centralized control of all parallel view LED light modules (1) and (9). The system local controller can be configured with wireless interface, allowing controls by a remote controller. Each individual parallel view LED light can be configured with add-on control and interface modules, as described on FIG. 25 through FIG. 27. The system configuration can be used for creating a billboard. The number, layout, and type of parallel view LED lights can vary. The layout can be used for signs, such as directional traffic signs, or information billboard. The main advantages of the apparatus when compared to existing signs and billboards include: parallel view of the light generated by parallel view LED light modules, which is more pleasant to the observer looking at the billboard; ability to create large scale parallel view billboards using plug and power parallel view LED lights, such as the (1), (9), or other designed based on principals and methods described in this application; ability to configure LED light modules with optional add-on features, such as: wireless remote controls, sensors for self-diagnostics. Selected parallel view LED lights can be connected through power splitter to battery backup, such as solar battery, and retain their operation during power outage. When apparatus is configured for applications such as signs, requiring backlighting of symbol, such as arrow directional signs, the symbols can be embedded or attached to the front flat panel of the parallel view LED lights (9), or an illumination panel similar to (68) can be placed in front of the (9), as illustrated on FIG. 20.

Figure 22:
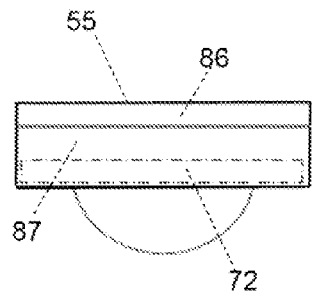

FIG. 22 illustrates side view of an example of an apparatus configured as a parallel view LED light (55), based on apparatus with configuration shown on FIG. 1, with an illuminated dome, and without optional add on modules. The enclosure of the (55) is configured to include: bottom or base assembly (86) and top assembly (87). The enclosure can be configured to comply with an industry standard water-proof rating, such as NEMA 4, IP66. To achieve this water-proof ratings the enclosure can be configured with a water-proof seal for the entire assembly, which would include: seal between the bottom (86) and top (87) assemblies, as well as a seal for the interface cable exit opening through the base (86). The configurations of the base assembly (86) include: round shape; rectangular shape. The configurations of the top assembly (87) include: round shape with the dome; rectangular shape with the dome. The apparatus can be configured with any combination of the base assembly (86) and the top assembly (87).

The configuration is mostly suitable for single color parallel view LED lights, with centralized controls from a local controller. The power interface for a single color LED light would consist of a two conductor cable, providing DC power to LED assembly (72).

Components are labeled as follows:

86—Bottom assembly, which is configured to include: light retaining, light reflection components; plug and power control interface for (55). For single color illumination the interface consists of two conductor cable providing DC power to the LED strip (72).

87—Top assembly, which is configured with a dome on the top. As shown, the illumination is generated by the LED strip (72), which can be configured to be installed along the entire inner perimeter of the top assembly, or section of. The top assembly can be configured to provide light diffusion, light retaining, with the main objective to direct the illumination from (72) toward the illuminated dome of (87).

Figure 23:
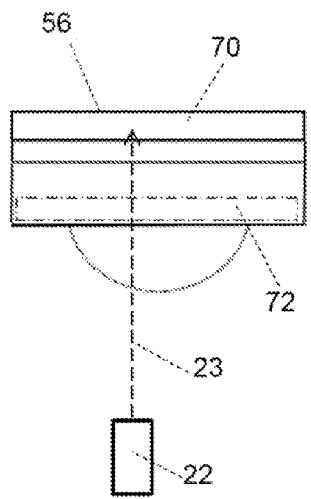

FIG. 23 illustrates side view of the intelligent apparatus (56) similar to the apparatus (55) shown on FIG. 22, but with addition of plug and power LED control module (70). The LED control module (70) is configured to be compatible with plug and power distribution and controls, as described in this application and in my patents. The apparatus (56) can be configured to include LED control module (70), as integrated directly, instead of being plugged-in. The LED control module (70) can be configured to provide local controls for the operator via infra-red interface (23) and remote controller (22). Controller (22) can be configured to match functionality features of the LED assembly (72). Depending on LED assembly (72) the controller (22) can include the following functions applied to LED assembly (72): power ON/OFF: illumination intensity; special effects such as blinking; color control when (72) is configured as a color LED. LED controller (22) configurations include functions to control LED assembly (72) based on: sensors of the controller (22), including sensor reporting internal temperature of the (56), sensor reporting ambient environment surrounding (56); time based controls, with time information provided by the controller, or remote controller. The LED controller can be configured to use sensors and perform self-diagnostics of the parallel view LED light (56) and surrounding environment, and then execute in real-time controls to maintain apparatus operation within outlined specifications. The add-on modules and the process of attaching them to the parallel view LED light can be configured to retain water-proof ratings of the LED light.

Figure 24:
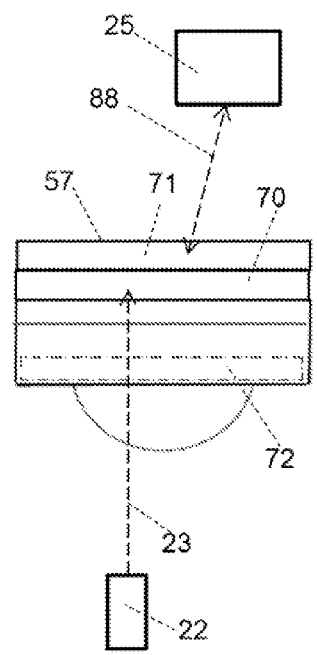

FIG. 24 illustrates side view of the intelligent apparatus (57) similar to the apparatus (56) shown on FIG. 23, but with addition of plug and power wireless control module (71). The wireless control module (71) is configured to be compatible with plug and power distribution and controls, as described in this application, and as described in my patents. The apparatus (57) can be configured to include wireless control module (71), as integrated directly, instead of being plugged-in. The wireless control module (71) can be configured to provide remote controls by a remote controller (25) over wireless interface (88). Remote controller (25) can change configuration of the intelligent parallel view LED light (57), and store configuration in the controller non-volatile memory. The control interface between various add-on modules of the apparatus, such as (70) and (71) can be configured as wireless. When configured as wireless, the add-on wireless control module (71) can wirelessly control LED controller (70), including all controls of (70) available through the remote controller (22). Configuration of the (57) can include: controls as function of trigger points set for sensors of the apparatus. Example 1: the power applied to LED assembly (72) can be controlled by (25) via (71) and (70) as function of the ambient light sensor of the apparatus: lower ambient light will increase the illumination intensity of the (72). Example 2: the power applied to LED assembly (72) can be controlled by (25) via (71) and (70) as function of the internal temperature sensor of the apparatus: higher temperatures will lower power applied to (72) and lower the illumination produced by the LED assembly (72), to prevent over heating of components inside the (57). Example 3: the power applied to LED assembly (72) can be controlled by (25) via (71) and (70) as function of the power efficiency criteria set in configuration of (57): based on set efficiency criteria, the power applied to (72) will vary to maintain the required level of efficiency of the (57). Depending on LED assembly (72) the remote controller (25) via wireless interface controller (71) can in real-time execute control algorithm of the LED assembly (72), including: power ON/OFF: illumination intensity: special effects such as blinking; color control when (72) is configured as a color LED. The wireless controller (71) can be configured to report status of (57) to remote controller (25), including reporting status of all sensors installed inside (57). The sensors of (57) can include sensors for self-diagnostics of (57), and sensors for monitoring ambient environment surrounding (57). Example 1: intelligent parallel view LED light (57) can be configured with a temperature sensor installed away from the internal heat producing electronics within (57), and as result, report temperature representing the ambient temperature surrounding the sensor. Remote controller (25) can use reported by wireless controller (71) ambient temperature surrounding (57), and depending on configuration of the control algorithm of (71), execute in real-time controls independent of an operator, to adjust control parameters of devices of the apparatus, including parallel view LED lights (55, 56, 57) and other devices, such as power supplies, to maintain required level of safety of the apparatus, and the safety of the environment surrounding the apparatus. Remote controller (25) can be configured to interface via wireless network, including INTERNET, with other remote controllers outside the apparatus, including security systems, and exchange status and sensor information.

The wireless controller (25) can be configured to use sensors and perform self-diagnostics of the parallel view LED light (57), and then execute in real-time controls to maintain apparatus operation within outlined specifications. The add-on modules and the process of attaching them to the parallel view LED light can be configured to retain water-proof ratings of the LED light.

Figure 25:
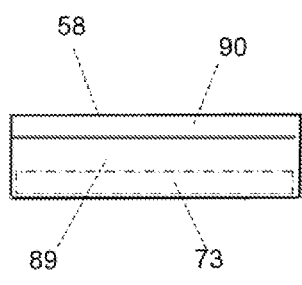

FIG. 25 illustrates side view of an example of an apparatus configured as a parallel view LED light (58), based on apparatus with configuration shown on FIG. 5., without optional add on modules. The enclosure of the (58) is configured to include: bottom or base assembly (90) and top assembly (89). The enclosure can be configured to comply with an industry standard water-proof rating, such as NEMA 4, IP66. To achieve this water-proof ratings the enclosure can be configured with a water-proof seal for the entire assembly, which would include: seal between the bottom (90) and top (89) assemblies, as well as a seal for the interface cable exit opening through the base (90). The configurations of the base assembly (90) include: round shape; rectangular shape. The configurations of the top assembly (89) include: round shape; rectangular shape. The apparatus can be configured with any combination of the configurations available for the base assembly (90) and the top assembly (89). The configuration is mostly suitable for single color parallel view LED lights, with centralized controls from a local controller. The power interface for a single color LED light would consist of a two conductor cable, providing DC power to LED assembly (73). The configuration of the apparatus (58) with the flat illuminated surface of the top assembly (89) allows the apparatus (58) to be used in a variety of applications, including: backlighting illuminated panels either attached to the front surface of the top assembly (89), or placed in-front of the front surface of the (89). The illuminated panel (not shown for simplicity) can be configured with embedded art, including symbols, characters. The parallel view LED lights illustrated by the drawings 25 through 27, and described in this application, with configuration for appropriate water-proof ratings, can be used for creating illumination within water filled aquariums.

Components are labeled as follows:

90—Bottom assembly, which is configured to include: light retaining, light reflection components; plug and power control interface for (58). For single color illumination the interface consists of two conductor cable providing DC power to the LED strip (73).

89—Top assembly, which is configured with a dome on the top. As shown, the illumination is generated by the LED strip (73), which can be configured to be installed along the entire inner perimeter of the top assembly, or section of. The top assembly can be configured to provide light diffusion, light retaining, with the main objective to direct the illumination from (73) toward the top surface of the top assembly (89).

Figure 26:
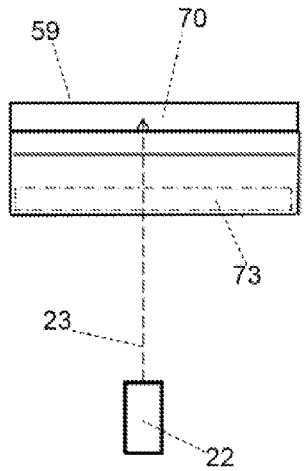

FIG. 26 illustrates side view of the intelligent apparatus (59) similar to the apparatus (58) shown on FIG. 25, but with addition of plug and power LED control module (70). The LED control module (70) is configured to be compatible with plug and power distribution and controls, as described in this application and in my patents. The apparatus (59) can be configured to include LED control module (70), as integrated directly, instead of being plugged-in. The LED control module (70) can be configured to provide local controls for the operator via infra-red interface (23) and remote controller (22). Controller (22) can be configured to match functionality features of the LED assembly (73). Depending on LED assembly (73) the controller (22) can include the following functions applied to LED assembly (73): power ON/OFF; illumination intensity; special effects such as blinking; color control when (73) is configured as a color LED. LED controller (22) can also include functions to control LED assembly (73) based on: sensors of the controller (22), such as sensor reporting internal temperature of the (59); time based controls. The LED controller (70) can be configured to use sensors and perform self-diagnostics of the parallel view LED light (59) and surrounding environment, and then execute in real-time controls to maintain apparatus operation within outlined specifications. The add-on modules and the process of attaching them to the parallel view LED light can be configured to retain water-proof ratings of the LED light.

Figure 27:
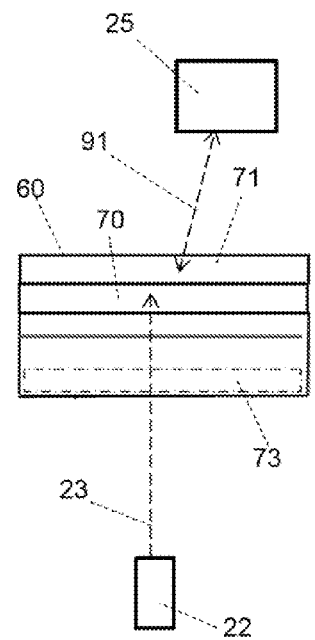

FIG. 27 illustrates side view of the intelligent apparatus (60) similar to the apparatus (59) shown on FIG. 26, but with addition of plug and power wireless control module (71). The wireless control module (71) is configured to be compatible with plug and power distribution and controls, as described in this application and in my patents. The apparatus (60) can be configured to include wireless control module (71), as integrated directly, instead of being plugged-in. The wireless control module (71) can be configured to provide remote controls by a remote controller (25) over wireless interface (91). Remote controller (25) can change configuration of the intelligent parallel view LED light (60), and store configuration in the controller non-volatile memory. Configuration of the (60) can include: controls as function of trigger points set for sensors of the apparatus. Example 1: the power applied to LED assembly (73) can be controlled by (25) via (71) and (70) as function of the ambient light sensor of the apparatus: lower ambient light will increase the illumination intensity of the (73). Example 2: the power applied to LED assembly (73) can be controlled by (25) via (71) and (70) as function of the internal temperature sensor of the apparatus: higher temperatures will lower power applied to (73) and lower the illumination produced by the LED assembly (73), to prevent over heating of components inside the (60). Example 3: the power applied to LED assembly (73) can be controlled by (25) via (71) and (70) as function of the power efficiency criteria set in configuration of (60): based on set efficiency criteria, the power applied to (73) will vary to maintain the required level of efficiency of the (60). Depending on LED assembly (73) the remote controller (25) via wireless interface controller (71) can in real-time execute control algorithm of the LED assembly (73), including: power ON/OFF; Illumination intensity; special effects such as blinking; color control when (73) is configured as a color LED. The control interface between various add-on modules of the apparatus, such as (70) and (71) can be configured as wireless. When configured as wireless, the add-on wireless control module (71) can wirelessly control LED controller (70), including all controls of (70) available through the remote controller (22). The wireless controller (71) can be configured to report status of (60) to remote controller (25), including reporting status of all sensors installed inside (60). The sensors of (60) can include sensors for self-diagnostics of (60), and sensors for monitoring ambient environment surrounding (60). Example 1: intelligent parallel view LED light (60) can be configured with a temperature sensor installed away from the internal heat producing electronics within (60), and as result, report temperature representing the ambient temperature surrounding the sensor. Remote controller (25) can use reported by wireless controller (71) ambient temperature surrounding (60), and depending on configuration of the control algorithm of (71), execute in real-time controls independent of an operator, to adjust control parameters of devices of the apparatus, including parallel view LED lights (58, 59, 60) and other devices, such as power supplies, to maintain required level of safety of the apparatus, and the safety of the environment surrounding the apparatus. Remote controller (25) can be configured to interface via wireless network, including INTERNET, with other remote controllers outside the apparatus, including security systems, and exchange status and sensor information.

The wireless controller (25) can be configured to use sensors and perform self-diagnostics of the parallel view LED light (60), and then execute in real-time controls to maintain apparatus operation within outlined specifications. The add-on modules and the process of attaching them to the parallel view LED light can be configured to retain water-proof ratings of the LED light.

Figure 28:
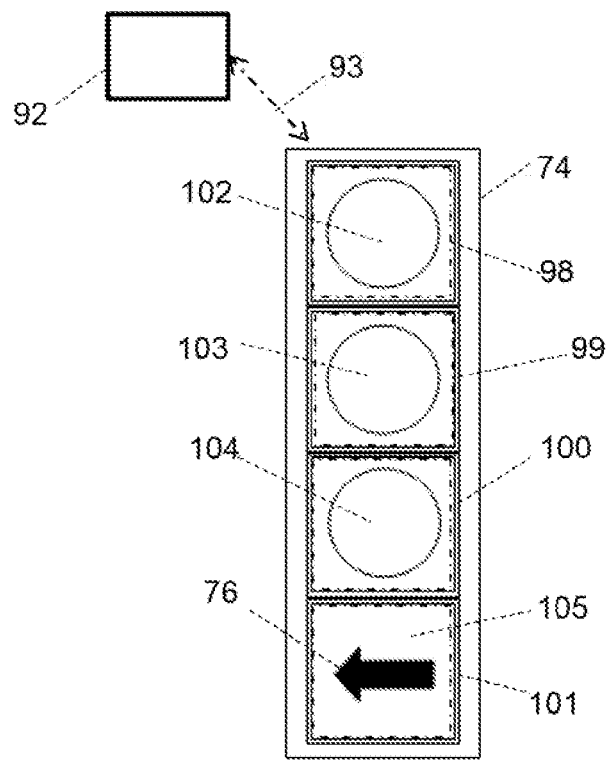

FIG. 28 illustrates front view of the intelligent apparatus (74) configured as a system of intelligent parallel view LED lights, which can be used for applications including traffic light.

The entire apparatus, as needed, will be configured for operation outdoors with ambient operating environment defined by apparatus specifications. The controller (92), which can be configured as: local, remote or combination of both, will use the wireless interface (93) to control the functionality of the apparatus (74), including status of each of the intelligent parallel view LED lights of (74). The (92) controls over each LED light will include: ON/OFF; illumination intensity; blinking. The controller (92) will also monitor status, or self-diagnostics, reported by each intelligent LED light and adjust overall controls to comply with acceptance criteria set in the controller configuration. Example 1: self-diagnostics of each LED light will include internal temperature of the LED light. Controller (93) will adjust Illumination intensity produced by the LED light to maintain specified level of safety, including not exceeding set maximum temperature level. Example 2: self-diagnostics of each LED light will include current consumption by the LED components of the LED light. Noticeable reduction of current can be result of a failed LED. Controller (93) will adjust illumination intensity produced by the LED light to compensate for potentially failed LED and maintain required level of illumination within specifications, without impacting other product specification parameter, including reliability. Example 3: self-diagnostics of apparatus (74) will include ambient light sensor. Controller (93) will adjust illumination intensity produced by the LED lights, as function of ambient light, optimizing use of power to provide required illumination under variable environmental conditions.

The description below is based on apparatus (74) being configured for operations as a traffic light controller.

Components are labeled as follows:

102—Intelligent parallel view LED lights with rectangular base assembly and rectangular top assembly with a dome, which can be configured based on intelligent parallel view LED light (57), as illustrated on FIG. 24. This type of parallel view LED lights are suitable for indicating respective color, as required by application, such as traffic control light. For applications as a traffic light, each parallel view LED light is configured to illuminate with a specific color, as described below. The LED assembly (98) is installed along the entire inner perimeter of the top assembly of the (102). For traffic light application, the LED assembly will consist of LED's producing RED color. In addition, the top illuminated surface of the (102), in addition of providing diffusion of the illumination produced by (98), can be also colored as RED to enhance the purpose of providing a RED signal for the traffic light.

103—Intelligent parallel view LED lights with rectangular base assembly and rectangular top assembly with a dome, which can be configured based on intelligent parallel view LED light (57), as illustrated on FIG. 24. The LED assembly (99) is installed along the entire inner perimeter of the top assembly of the (103). For traffic light application, the LED assembly (99) will consist of LED's producing YELLOW color. In addition, the top illuminated surface of the (103), in addition of providing diffusion of the illumination produced by (99), can be also colored as YELLOW to enhance the purpose of providing a YELLOW signal for the traffic light.

104—Intelligent parallel view LED lights with rectangular base assembly and rectangular top assembly with a dome, which can be configured based on intelligent parallel view LED light (57), as illustrated on FIG. 24. The LED assembly (100) is installed along the entire inner perimeter of the top assembly of the (104). For traffic light application, the LED assembly (100) will consist of LED's producing GREEN color. In addition, the top Illuminated surface of the (104), in addition of providing diffusion of the illumination produced by (100), can be also colored as GREEN to enhance the purpose of providing a GREEN signal for the traffic light.

105—Intelligent parallel view LED light with rectangular base assembly and rectangular top assembly with a flat top illuminated surface without a dome, which can be configured based on intelligent LED light (60) as illustrated on FIG. 27. The LED assembly (101) is installed along the entire inner perimeter of the top assembly of the (105). For traffic light application, the LED assembly (101) will consist of RGB color LED's producing selected colors, typically: YELLOW and GREEN, under controls of (92). This type of parallel view LED light is suitable for backlighting a traffic direction arrow (76), which is embedded into the illuminated flat surface of the top assembly of (105).

Figure 29:
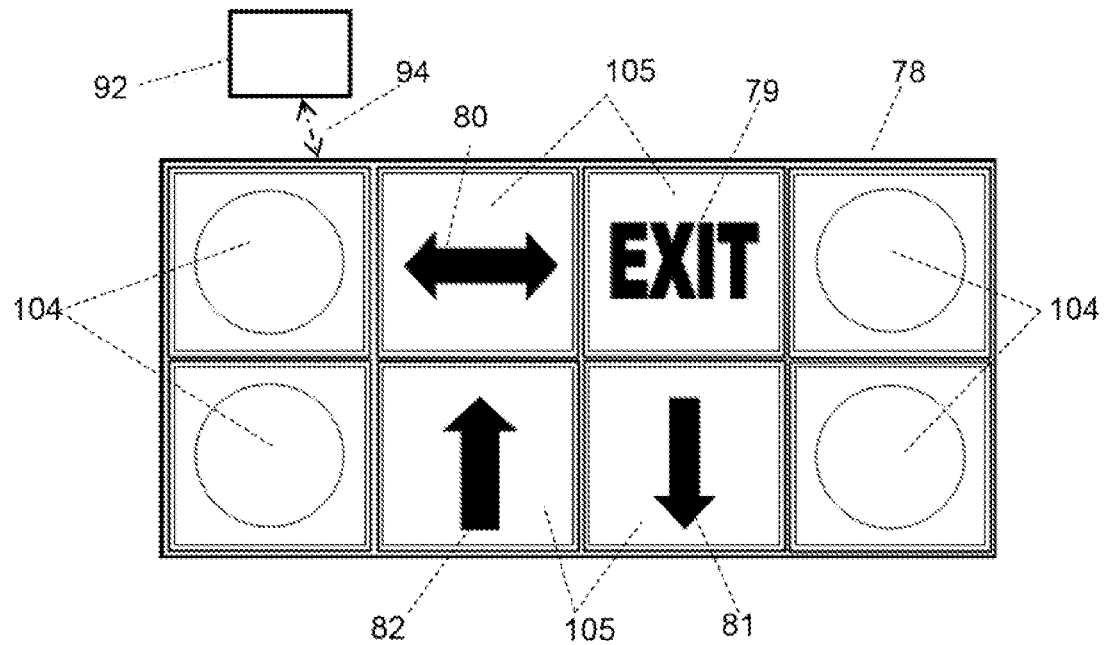

FIG. 29 illustrates front view of the intelligent apparatus (78) configured as a system of intelligent parallel view LED lights, which can be used for applications including traffic control within public transportation facilities, such as: airports, train station, metro. The apparatus configuration, including: layout of the apparatus, and selection of individual intelligent parallel view LED lights, can vary to meet requirements of a specific application.

As shown, the apparatus (78) is configured to direct to an EXIT using the most optimum route specified by the apparatus. The selection of the EXIT route can be based on predefine criteria, which can include: shortest time to reach an EXIT; safest EXIT. The apparatus (78) configuration, including predefined acceptance criteria, and control algorithm, are stored in controller (92) non-volatile memory. Apparatus (79) sensors (not shown for simplicity) are used to provide controller (92) with real-time status of available EXITS. The sensors will monitor: distance to the EXIT and current traffic to the EXIT, and EXIT safety status. Controller (92) based on information provided by sensors will apply control algorithm and determine the most optimum route from the point the apparatus (78) is installed to the EXIT determined by controller (92) as the one meeting the acceptance criteria. The selection of colors for each intelligent parallel view LED light described below is for illustration purposes only. The entire apparatus (78), as needed, can be configured for operation outdoors with ambient operating environment defined by apparatus specifications. The controller (92), which can be configured as: local, remote or combination of both, will use the wireless interface (94) to control the functionality of the apparatus (78). Including status of each of the intelligent parallel view LED lights of (78).

Components are labeled as follows:

104—Intelligent parallel view LED lights with rectangular base assembly and rectangular top assembly with a dome, similar to the one described on FIG. 28, which can be configured based on intelligent parallel view LED light (57), as illustrated on FIG. 24. The LED assembly (not shown) can be installed along the entire inner perimeter of the top assembly of the (104). The color selected for all parallel view LED lights (104) can be based on status and include: RED, YELLOW and GREEN colors.

105—Intelligent parallel view LED light with rectangular base assembly and rectangular top assembly with a flat top illuminated surface without a dome, which can be configured based on intelligent LED light (60) as illustrated on FIG. 27. The LED assembly inside (105), no shown for simplicity, can be installed along the entire inner perimeter of the top assembly of the (105). As shown, the intelligent parallel view LED lights (105) are configured to illuminated the following symbols: "EXIT" (79) indicating the purpose of the apparatus, as "EXIT" real-time navigation device: "ARROWS", left-right (80), forward or up (82), down (81), indicating the recommended direction(s) to reach the EXIT from this location, based on acceptance criteria and control algorithm configured for the apparatus (78). The color selected for all parallel view LED lights (105) can be based on the illuminated symbol or sign, and include: BLUE, RED, YELLOW and GREEN colors.

EXAMPLE 1

The apparatus (78) is functional, and controller (92) had determined that at the current time the EXIT (79) has the most optimum routes indicated by the "left-right" ARROW (80). As result, the controller (92) will execute controls to: illuminate (105) with the sign "EXIT" (79) in BLUE color; and (105) with a symbol "left-right" ARROW (80) in GREEN color, and (104) on the left side next to the (105) with a symbol "left-right" ARROW (80) will be blinking in GREEN color, raising attention of viewers to the EXIT navigation in the directions indicated by "left-right" ARROW (80). Other directional signs (81) and (82) can remain OFF, or illuminated with other colors. YELLOW color can indicate the EXIT in the direction backlighted is available, but the traffic is medium. RED color can indicate the EXIT is very busy, or not accessible. The controller (92) can enhance status indication of a specific EXIT route by controlling LED's illumination features, including: illumination intensity; blinking; color rolling effects, etc.

The apparatus described in this application can be configured for variety of applications, including providing: general lighting; backlighting of signs and art.

FIG. 30 illustrates 3D view example of an apparatus (10) which is configured as a parallel view LED light with an LED assembly (11) installed along the adjacent sides of the top assembly (10B). The inner surfaces of the bottom assembly (10A) can be configured or designed to provide required levels of light retention and reflection toward the top surface (95). As needed, the enclosure of the apparatus can be configured with additional components, including light reflecting surfaces such as mirror surfaces, can be added. The apparatus (10) will be configured with a power and control interface compatible with plug and power distribution, as described in this application and as described in my patents. For simplicity not all components are shown. This configuration allows the apparatus (10) to be used in a variety of applications, including: backlighting illuminated panels either attached to the front surface (95) of the top assembly (10B), or placed in-front of the (95). The illuminated panel (not shown for simplicity) can be configured with embedded art, including symbols, characters. The enclosure of the apparatus (10) can be configured to include hidden magnets to allow the apparatus (10) to be snap-in or latch-in mounting to a surface with inserts mating with the magnetic properties of the inserts of (10), and holding the apparatus (10) in-place. Depending on the dimension of (10) and application for its use, additional LED assembly (11A) can be added at a higher layer, providing parallel view illumination in the direction (106A) and (107A). In general, the apparatus can be configured with multi-layer LED Illumination sources, including LED strips. Each Illumination layer can be configured and controlled independently. The objectives include providing required levels of illumination and uniformity.

The apparatus components are labeled as follows:

95—Illuminated surface of the top assembly (108) of the apparatus

11—Illumination layer 1 consisting of LED assembly configured as flex LED strip adhered or attached to the inner sides of the top assembly, as shown

11A—Illumination layer 2 consisting of LED assembly configured as flex LED strip adhered or attached to the inner sides of the top assembly, as shown

106, 107—Direction of illumination provided by the illumination layer 1. LED assembly (11), which is in-parallel to the illuminated surface (95) of the top assembly (10B)

106A, 107A—Direction of illumination provided by the Illumination layer 2, LED assembly (11A), which is in-parallel to the illuminated surface (95) of the top assembly (10B)

97—Direction of illumination provided by the parallel view LED light (10)

Figure 31:
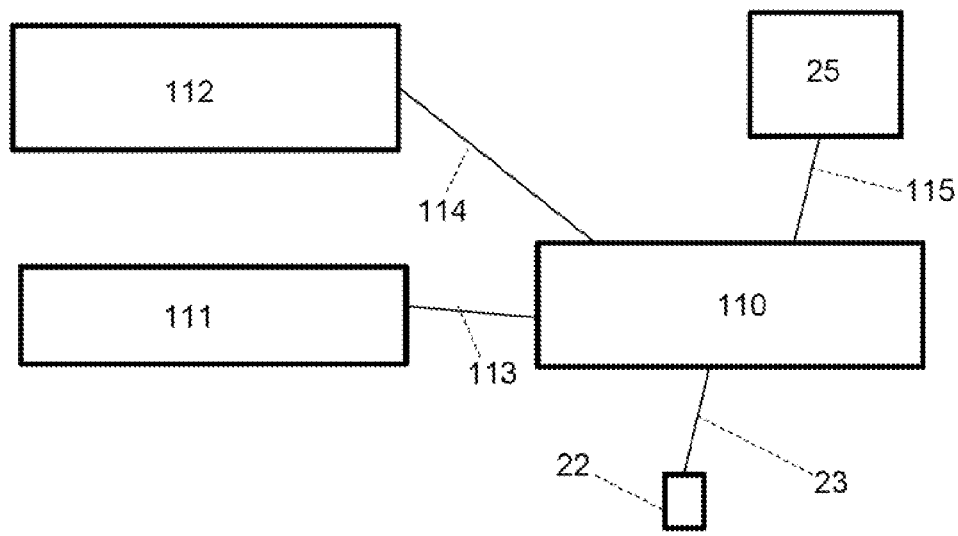

FIG. 31 illustrates a block-diagram, as an example of an apparatus configuration consisting of a host controller (25), master intelligent parallel view light (110), master intelligent parallel view light (112), slave parallel view light (111). In general, the apparatus can be configured as: a stand-alone independent device; a master device or as a slave device. The stand-alone configuration enables the apparatus operation independent of other devices or systems. The master configuration enables the apparatus to interface with other devices or apparatuses within a system of apparatuses. The slave configuration enables the apparatus to be interfaced and controlled by a master apparatus within a system of apparatuses. The interface between master and slave apparatuses configuration includes: wireless, wired, and combination of both.

In the example, the host via wireless interface (115) will control the master (110). The master (110) will directly via power control hardwired interface (113) control light (111), and via wireless interface (114) communicate and control light (112). Each intelligent light (110, 112) can be configured, with a range of configurations described in this application. The hardwired interface (113) can be configured to allow (110) to execute direct controls of the power and light parameters of the (111). The intelligent light (112) can be further interfaced to other lights, not shown for simplicity. The light (110) can be also controlled by an user via remote controller (22) over wireless interface (23). The example illustrates apparatus configuration as a networked distributed system with daisy-chained control architecture. Communication and controls throughout the entire system include: local (device level) and global (system level) self-diagnostics.

The system configurations include control algorithm for general illumination, including Illumination as function of levels of ambient light; ambient environment monitoring and status reporting, including safety monitoring regardless of level of ambient light. An example of the algorithm: (110) can detect alarming level temperatures at the location where (110) is installed, and respectively communicate the information to the host (25) via (115), as well as directly control (111) via (113), and then via interface with other lights (112 as an example, via 114) within the system, providing warning visual and information indications of elevated temperature measured by (110) to users located remotely from the location of (110). The configuration of devices within the system, the configuration of the interfaces between the devices, and the configuration of the control algorithm include configurations enabling the system to perform variety of functions, including: illumination control functions; safety monitoring and reporting functions. Safety monitoring and reporting functions include: monitoring environment; adjusting power consumption and illumination based on measured conditions of the environment; communicating status to a remote host, and other devices within the system; executing controls to adjust system and device level parameters, including power consumption, light intensity; sustaining system operation within defined safety criteria under real-time measured ambient environment; provide visual indications via local and remote illumination devices of the system status; providing information about the status to remote controllers. The apparatus can be configured for reporting safety status regardless of level of ambient light. The apparatus can be configured as a system, and the system configurations including: monitoring status of devices and environment at one location, and reporting the status and executing respective controls at the same location, and reporting the status and executing respective controls at a remote location. The control algorithm of the apparatus can be configured to include time-based controls, with the time information provided by the controller, or by a remote controller.

The invention claimed is:

1. An intelligent modular configurable apparatus comprising:
   at least one configurable solid-state light source;
   at least one configurable sensor;
   at least one configurable power source;
   at least one configurable controller;
   at least one configurable interface;
   wherein the at least one solid-state light source is configured to provide illumination of an area or a section of an area surrounding the light; said light source configurations include configuration providing illumination in a direction which is substantially parallel to the area: said light source configured as a light generating device;
   wherein the at least one sensor is configured to monitor environment; said environment including the environment within the apparatus and the environment surrounding the apparatus; said environment including ambient light, temperature, power source;
   wherein the at least one controller is configured to connect with the at least one solid-state source; said controller is further configured for monitoring and controlling operation of the light source;
   wherein the at least one controller is configured to connect with the at least one sensor; said controller is further configured for monitoring status of the sensor;
   wherein the at least one power source is configured to power the apparatus; said power source configurations include conventional DC power supply, battery, and solar battery;
   wherein the at least one controller is configured to execute a control algorithm; said control algorithm includes configuration of the algorithm maintaining operation of the apparatus within acceptance criteria: said acceptance criteria include status of the sensors and trigger level points for the sensors, which are used by the algorithm and the controller for maintaining operation of the apparatus within the acceptance criteria: said acceptance criteria are configured to include specification parameters of components comprising the apparatus; said control algorithm includes configuration requiring the controller to use the components comprising the apparatus within the components specification requirements;
   wherein the at least one interface configurations include configuration of: the interface between the at least one light source of the apparatus to a remote host; the interface between the light sources within the apparatus; and said interface including one or a combination of: wireless, or wired.

2. The intelligent apparatus of claim 1 further comprising: the at least one solid state light source configured as an LED, and the at least one solid state light source configured to provide illumination in a direction substantially parallel to the surface being illuminated.

3. The intelligent apparatus of claim further comprising: the apparatus configured as a illumination light or device, providing illumination of an area or a section of an area surrounding the light, and the configurations of the apparatus include: ceiling light, furniture light, appliance light task light, floor light, patio light, street light, backlighting.

4. The intelligent apparatus of claim 1 further comprising: the controller configured to include a non-volatile memory; and the controller using the non-volatile memory for storing information, and the information including: the apparatus configuration, the apparatus control algorithm, the apparatus status.

5. A method of controlling an intelligent modular configurable apparatus consisting of:
configuring the apparatus to provide general illumination; said apparatus configurations include: configuration for operating as a source of light said source of light Including angle color or a multi-color light; or combination of both;
configuring the apparatus to include a number of illumination devices operating as a system;
configuring the apparatus as one of the following:
a stand-one independent device; said stand-alone configuration enabling the apparatus operation independent of other devices or systems;
or a master device, said master device configuration enabling the apparatus to interface with other devices or apparatuses within a system of apparatuses; said interface enabling the master device to control the other devices;
or a slave device; said slave device configuration enabling the apparatus to interface with at least one master device;
programming a controller of the intelligent apparatus to execute a control algorithm and storing the algorithm within a non-volatile memory of the controller;
setting at least one acceptable operating criteria for the controller and storing the criteria within the non-volatile memory of the controller;
configuring the operating criteria, and the configuration including at least one preset level for a measurement to be made by the controller, and the measurement including status of a sensor connected to the controller;
the sensors providing status of an ambient environment surrounding the apparatus; said sensors configurations include configuration for providing the status of: ambient light and an object proximity;
the status of the ambient environment including levels of supply voltage, ambient temperature, ambient light;
the controller executing the algorithm stored in the non-volatile memory, and the algorithm configurations including configuration maintaining operation of the apparatus within the at least one acceptable operating criteria;
the controller executing the algorithm stored in the non-volatile memory, and the algorithm configurations including: configuration of controls based on the status of the sensors, configuration of controls based on time, and the time information Is provided by the controller or a remote controller;
the controller executing the algorithm stored in the non-volatile memory, and the algorithm configurations including configuration of the algorithm informing an operator and/or remote controller when a status of the apparatus is not within the at least one acceptable operating criteria;
the controller executing the algorithm stored in the non-volatile memory, and the algorithm configuration including configuration for the controller to execute controls of at least one illumination device within the at least one acceptable operating criteria;
the at least one illumination device configurations include configuration of the illumination device as LED;
the operator detecting the status of the apparatus by analyzing the operation of the apparatus, including visual affects Invoked by the controller and indicated by the apparatus, which are unique to the status of the controller;
the controller executing the algorithm stored in the non-volatile memory, and the algorithm configurations including configuration preventing damage to components of the apparatus when the status of the apparatus is not within the acceptable operating criteria;
configuring the apparatus with an enclosure, and the enclosure configuration supporting installation of the apparatus, including configuration of the enclosure containing hidden magnets for latch-in mounting to the magnet matching bracket.

6. The method of claim 5 further comprising: wherein the configuration of the apparatus, including the configuration of the acceptance criteria, are entered by an operator, and the entry process by the operator includes configuration enabling the operator executing a pre-defined sequences interrupting the ambient light to the ambient light sensor and affecting status of the ambient light sensor, and the entry process configurations include configuration for the operator for interrupting the ambient light within a predefined time window after power is applied to the apparatus.

7. The method of claim 5 further comprising: wherein the configuration of the apparatus, including the configuration of the acceptance criteria, are entered by an operator, and the entry process configurations include configuration enabling the operator executing a pre-defined sequences affecting status of the proximity sensor, and the entry process configurations include configuration for the operator for approaching and affecting status of the proximity sensor within a predefined time window after power is applied to the apparatus.

8. The method of claim 5 further comprising: wherein the acceptance criteria for the apparatus are configured to include optimization of using energy resources, which are providing power to the apparatus; and the acceptance criteria for the apparatus include configuration enabling optimization of using at least one Illumination device of the apparatus, and me apparatus providing sufficient illumination, including general illumination, and the illumination is generated by the apparatus as function of the status of the sensors.

9. The method of claim 5 further comprising: wherein the intelligent apparatus configurations include low DC powered light devices, providing general illumination for residential, commercial and industrial structures; and the configurations of the control algorithm include configuration of the light devices, and the light devices contributing to Improvements of environmental safety.

10. The method of claim 5 further comprising: wherein the at least one acceptance criteria for the apparatus is configured to use a configurable power source, and the configurations of the power source include configuration which during a loss of a conventional power will enable automatic switch over from the conventional power to a battery backup, and the controller of the apparatus configured to detect the change in the power source, and the controller is further configured for optimizing power usage by the apparatus prolonging useful We of the battery backup.

11. The method of claim 5 further comprising: wherein the at least one acceptance criteria for the apparatus is configured to enable the controller of the apparatus to select a power source from available power sources, and is further configured to select the power source meeting the acceptance criteria, including automatically switching over from the conventional power to a battery backup, and the controller optimizing power usage by the apparatus prolonging useful life of the battery backup.

12. The method of claim 5 further comprising: wherein the configurations of the intelligent apparatus include: configurations as a stand-alone independent device; configurations as a master device or as a slave device, and the stand-alone configurations enabling operation of the stand-atone apparatus independent of other devices or systems; and the master configurations enabling the master apparatus to interface with other devices or apparatuses within a system; and the master configuration including configuration enabling the master apparatus to control at least one slave device within a system; and the slave configurations including configuration enabling the apparatus to be interfaced and controlled by a master apparatus within a system; and the configurations of the interface between the master and the slave apparatuses include: wireless, wired, and combination of both.

13. The method of claim 5 further comprising: wherein the configurations of the intelligent apparatus include an interface with at least one remote controller, and the remote controller includes: mobile phones, IR remote and RF remote, and the interlace protocol configurations include configuration supporting: verification of status of the apparatus; changing configuration of the apparatus.

14. The method of claim 5 further comprising: wherein the intelligent apparatus configurations include battery backup power source, and the battery power source configurations include sustaining operation of the apparatus during a power outage.

15. The method of claim 5 further comprising: wherein the intelligent apparatus is configured to monitor status of ambient temperature, and is further configured per at least one acceptable operating criteria, and the acceptance criteria including controls per status of the ambient temperature of the at least one illumination device, and the controls including the device visual indication to an operator when the temperature has exceeded predefined acceptance criteria; and by warning the operator of a potential problem—the apparatus contributing to Improvements in environmental safety.

16. The method of claim 5 further comprising: wherein the intelligent apparatus is configured to monitor status of ambient light, and is further configured per at least one acceptable operating criteria, and the acceptance criteria including controls per status of the ambient light of the at least one illumination device, and by controlling the illumination device per status of ambient light—the apparatus contributing to improvements in environmental safety.

17. The method of claim 5 further comprising: wherein the configurations of the intelligent apparatus Include configuration for monitoring ambient temperature, and the apparatus is further configured to detect a condition when the ambient temperature is below predefined acceptable operating criteria, and based on that condition the apparatus controlling the at least one illumination device with a purpose of generating self-heating within the apparatus, maintaining the operating environment within the apparatus specifications, and extending operation of the apparatus to low ambient temperatures without impacting reliability of the apparatus.

18. The method of claim 5 further comprising: wherein the controller is executing the control algorithm, including monitoring status of the sensors, and the controller maintaining operation of the apparatus within the acceptable operating criteria at all times, and configurations of the acceptable criteria include configuration requiring the controller not to exceed illuminations set by specification requirements for the apparatus.

19. The method of claim 5 further comprising: wherein the apparatus is configured as a system of Illumination devices and the system executing the control algorithm, including monitoring status of the sensors, and maintaining operation of the system within the acceptable operating criteria at all times, and configurations of the acceptable criteria include configuration requiring the controller not to exceed limitations set by specification requirements for the system.

20. The method of claim 6 further comprising: wherein the apparatus is configured as a system of illumination devices; the system configurations include configuration requiring the system executing a control algorithm; the configurations of the control algorithm include: configuration requiring the system to monitor status of the environment at one location, and the system reporting the status and executing controls at that location; configuration requiring the system based on the status at that location, reporting the status and executing controls at a remote location; and the configurations of the reporting of the status and executing of the controls—includes configuration of visual affects produced by the illumination devices.

* * * * *